(12) United States Patent
Lugtigheid

(10) Patent No.: US 11,046,580 B2
(45) Date of Patent: Jun. 29, 2021

(54) METHOD AND APPARATUS FOR OBTAINING A MIXTURE FOR PRODUCING H2, CORRESPONDING MIXTURE

(71) Applicant: H2FUEL-SYSTEMS B.V., Voorschoten (NL)

(72) Inventor: Gerardus Wilhelmus Lugtigheid, Spijkenisse (NL)

(73) Assignee: H2FUEL-SYSTEMS B.V., Voorschoten (NL)

( * ) Notice: Subject to any disclaimer, the term of this patent is extended or adjusted under 35 U.S.C. 154(b) by 0 days.

(21) Appl. No.: 15/773,892

(22) PCT Filed: Nov. 7, 2016

(86) PCT No.: PCT/NL2016/050775
§ 371 (c)(1),
(2) Date: May 4, 2018

(87) PCT Pub. No.: WO2017/078533
PCT Pub. Date: May 11, 2017

(65) Prior Publication Data
US 2018/0319659 A1     Nov. 8, 2018

(30) Foreign Application Priority Data

Nov. 6, 2015 (NL) ................................. 2015739
Mar. 7, 2016 (NL) ................................. 2016379

(51) Int. Cl.
*A62D 1/00* (2006.01)
*C01B 3/00* (2006.01)
(Continued)

(52) U.S. Cl.
CPC ............... *C01B 3/065* (2013.01); *B01J 7/02* (2013.01); *Y02E 60/36* (2013.01)

(58) Field of Classification Search
None
See application file for complete search history.

(56) References Cited

U.S. PATENT DOCUMENTS

| 7,803,349 B1 * | 9/2010 | Muradov | ............... C01B 3/065 423/650 |
|---|---|---|---|
| 2004/0047801 A1 | 3/2004 | Petillo et al. | |

(Continued)

FOREIGN PATENT DOCUMENTS

| CN | 1980854 A | 6/2007 |
|---|---|---|
| CN | 1980856 A | 6/2007 |

(Continued)

OTHER PUBLICATIONS

International Search Report, dated Feb. 2, 2017, from corresponding PCT/NL2016/050775 application.

(Continued)

*Primary Examiner* — Joseph D Anthony
(74) *Attorney, Agent, or Firm* — Nixon & Vanderhye

(57) ABSTRACT

A method for obtaining a mixture for producing $H_2$, the mixture comprising a metal borohydride, $Me(BH_4)_n$, a metal hydroxide, $Me(OH)_n$, and $H_2O$, in which Me is a metal and n is the valance of the metal ion. The $H_2O$ is provided in ultrapure water, UPW, the UPW having an electrical conductance below 1 µS/cm. The method comprises dissolving the metal borohydride and the metal hydroxide in UPW to obtain the mixture for producing $H_2$ comprising an amount of borohydride, $BH_4$, groups of the metal borohydride in the range of 45 to 55% mol of the mixture, an amount of hydroxide, OH, groups of the metal hydroxide in the range of 2 to 5% mol of the mixture, and at least substantially UPW for the remainder of the mixture.

16 Claims, 13 Drawing Sheets

(51) Int. Cl.
 C01B 3/06 (2006.01)
 B01J 7/02 (2006.01)

(56) References Cited

U.S. PATENT DOCUMENTS

| | | | | |
|---|---|---|---|---|
| 2004/0052722 | A1* | 3/2004 | Jorgensen | H01M 8/065 423/648.1 |
| 2005/0079129 | A1* | 4/2005 | Venkatesan, Sr. | C01B 3/0031 423/658.2 |
| 2005/0155279 | A1* | 7/2005 | Finkelshtain | C01B 3/065 44/251 |
| 2006/0196112 | A1* | 9/2006 | Berry | C10L 5/40 44/550 |
| 2006/0210470 | A1* | 9/2006 | Shafirovich | C06D 5/06 423/648.1 |
| 2006/0213120 | A1* | 9/2006 | Sklyarsky | B01J 13/0034 44/436 |
| 2010/0143240 | A1 | 6/2010 | Najim et al. | |
| 2011/0286913 | A1* | 11/2011 | Lugtigheid | B67D 7/04 423/658.2 |

FOREIGN PATENT DOCUMENTS

WO 2006/090205 A1 8/2006
WO 2010/087698 A2 8/2010

OTHER PUBLICATIONS

Duffin, A. et al., "Electronic structure of aqueous borohydride: a potential hydrogen storage medium," Phys. Chem. Chem. Phys., 2011, 13, 17077-10783.

Gervasio, D. et al., "Properties of aqueous alkaline sodium borohydride solutions and by-products formed during hydrolysis," presented at the Fuel Cell Design, Fabrication and Materials Selection Workshop Grainger Engineering Library, Room 335 1301 W. Springfield Ave. University Illinois Urbana Champaign Urbana, Illinois 61801 Jul. 26-27, 2005.

Simagina, V. et al., "Progress in the catalysts for H2 generation from NaBH4 fuel," Current Topic in Catalysis, vol. 10, 2012.

Wikipedia, "Solubility table," https://en.wikipedia.org/wiki/Solubility_table.

Wu, Y., "Hydrogen Storage via Sodium Borohydride: Current Status, Barriers, and R&D Roadmap" Presented at GCEP—Stanford University Apr. 14-15, 2003.

* cited by examiner

METHOD AND APPARATUS FOR OBTAINING A MIXTURE FOR PRODUCING H2, CORRESPONDING MIXTURE

FIELD OF THE INVENTION

The invention relates to method for obtaining a mixture for producing $H_2$, and a corresponding kit, mixture and apparatus. The invention further relates to a method for producing hydrogen, and a corresponding apparatus.

BACKGROUND OF THE INVENTION

The considerable costs involved in the production, storage and transportation of $H_2$ (referred to as hydrogen, a hydrogen atom will be referred to as atomic hydrogen) prevent its fast and wide introduction. Its breakthrough is only expected to occur in case the price of hydrogen has generally decreased to a present price level of electricity, gasoline, diesel, natural gas, etcetera per unit of produced energy, such as costs per mega joule (€/MJ).

Presently, three types of production processes are known in which hydrogen is produced:
- As a byproduct of another chemical process, for which the energy required to release the hydrogen is of secondary importance;
- A steam reforming technique, for which the energy required to produce hydrogen is about 140 $MJ/kgH_2$ (141.1 kJ/mole); and
- An electrolysis technique, for which the energy required to produce hydrogen is 204.5 $MJ/kgH_2$ (206.1 kJ/mole).

When the environmental $CO_2$ footprint of the hydrogen production is taken into account then a zero $CO_2$ footprint can only be obtained by using electricity produced through sources such as wind, water, geothermic sources and solar. Nuclear power could be employed as an alternative, in which use of thorium as a fuel is strongly preferred in view of environmental considerations. The use of biomass in the steam reforming technique is being considered as $CO_2$ neutral.

Hydrogen is used in a gas form. Its conversion to heat generally is done using burning or a catalyst, and its conversion to electrical energy generally by employing a fuel cell. The following disadvantages can be observed:
- The low specific weight of hydrogen implies that hydrogen gas fuel requires a lot of space per kilogram, which makes transport by road or over water costly;
- A core problem in the use of hydrogen for energy generation is its energy loss with present production methods; and
- Energy is lost in hydrogen storage when cooling or compressing the hydrogen.

It has been tried to solve the transport problem for long distances by liquefying the hydrogen. In practical use such a technique showed many disadvantages in the form of costs and complexity involved. It requires a lot of energy to keep the hydrogen cold enough for keeping it in a liquid state. Evaporation generally starts after about 14 days when the hydrogen is stored in a Dewar, and will start immediately in a normally isolated container. The hydrogen evaporated can be used as a fuel to, for instance, power the vessel or truck used for transportation. Based on experience, in practical applications, one has raised the pressure of compressed hydrogen from 300 bar to 700 bar to have a sufficient transport range, which involves a loss of about 6% of the hydrogen for its storage during transport.

No practical solutions have been proposed so far to alleviate the disadvantages referred to.

SUMMARY OF THE INVENTION

It is an objective of the invention to provide a method and apparatus for obtaining a mixture for producing $H_2$, corresponding mixture, and a method and apparatus for producing $H_2$, which do not or do almost not have the disadvantages of the known method and techniques.

It is another or alternative objective of the invention to provide a liquid $H_2$ fuel that satisfies the requirements of the US Department of Energy (US DoE) and the StorHy consortium (Hydrogen Storage Systems for Automotive Application), together with any apparatuses and/or devices for mixing and release of the chemically bound $H_2$.

The technique disclosed assumes the method for production of $H_2$ as disclosed in WO 2010/087698 A2, which discloses that a metal borohydride dissolved in water having a conductivity <0.5 µS/cm provides a good reaction for the production of $H_2$. The reaction will continue as long as water and hydrides are available, and continues completely. The fuel as disclosed in WO 2010/087698 A2 will in the present disclosure be referred to as a borohydride fuel.

At least one of the above objectives is achieved by a method for obtaining a mixture for producing $H_2$, the mixture comprising a metal borohydride, $Me(BH_4)_n$, a metal hydroxide, $Me(OH)_n$, and $H_2O$, in which Me is a metal and n is the valance of the metal ion, wherein $H_2O$ is provided in ultrapure water, UPW, the UPW having an electrical conductance below 1 µS/cm, and the method comprises dissolving the metal borohydride and the metal hydroxide in UPW to obtain the mixture for producing $H_2$ comprising an amount of borohydride, $BH_4$, groups of the metal borohydride in the range of 45 to 55% mol of the mixture, an amount of hydroxide, OH, groups of the metal hydroxide in the range of 2 to 5% mol of the mixture, and at least substantially UPW for the remainder of the mixture.

The metal (Me) in the present specification comprises any material usually referred to as a metal, including any alkali metals, transition metals, complex metals, etc. Examples are, for instance, lithium (Li), sodium (Na), potassium (K), magnesium (Mg) and aluminium (Al). Generally, the metal in the metal borohydride and the metal hydroxide can be different metals, but they are preferably the same metal. The mixture provides for a stabilized mixture in which the metal borohydride, will only react to provide a half-time value given by the pH value of the mixture. The mixture provided by the invention appears to be very stable, can be used down to very low temperatures and provides for a high energy density ratio. The amount of water present in the mixture is large enough for producing $H_2$ under practical circumstances from the mixture with some additional water supplied.

In an embodiment the method comprises the steps of
- dissolving an amount of the metal hydroxide in $H_2O$ to provide an auxiliary mixture of metal hydroxide dissolved in $H_2O$; and
- dissolving an amount of the metal borohydride in the auxiliary mixture of metal hydroxide dissolved in $H_2O$ to provide the mixture for producing $H_2$.

In an embodiment the mixture for producing $H_2$ comprises an amount of hydroxide groups of the metal hydroxide in the range of 3 to 4% mol.

In an embodiment the mixture for producing $H_2$ comprises an amount of borohydride groups of the metal borohydride in the range of 48 to 53% mol.

In another aspect the invention provides for a kit for carrying out the method according to any one of the preceding claims, wherein the kit comprises at least one of the metal borohydride, the metal hydroxide and UPW.

In yet another aspect the invention provides for a mixture for producing $H_2$, wherein the mixture comprises a metal borohydride, $Me(BH_4)_n$, and a metal hydroxide, $Me(OH)_n$, dissolved in $H_2O$, in which Me is a metal and n is the valance of the metal ion, wherein $H_2O$ is provided in ultrapure water, UPW, the UPW having an electrical conductance below 1 µS/cm, and the mixture comprises an amount of borohydride, groups of the metal borohydride in the range of 45 to 55% mol, optionally in the range of 48 to 53% mol, of the mixture, an amount of hydroxide, OH, groups of the metal hydroxide in the range of 2 to 5% mol, optionally in the range of 3 to 4% mol, of the mixture, and at least substantially UPW for the remainder of the mixture.

In an embodiment the mixture is obtained by a method referred to above.

In an embodiment the UPW satisfies at least one of having an electrical conductance below 0.5 µS/cm, optionally below 0.1 µS/cm, optionally below 0.06 µS/cm, and having an Electronics and Semiconductor Grade Water ASTM Type E-1 classification or better.

In an embodiment the metal, Me, is at least one of lithium, Li; sodium, Na; and potassium, K, which provides, inter alia, for an optimum weight to energy density ratio.

In yet another embodiment the metal, Me, is sodium, Na, and the mixture for producing $H_2$ comprising an amount of sodium borohydride, $NaBH_4$, in the range of 58 to 72% wt, optionally in the range of 62 to 69% wt, of the mixture, and an amount of sodium hydroxide, NaOH, in the range of 3 to 7% wt, optionally in the range of 4 to 6% wt, of the mixture.

In another aspect the invention provides for an apparatus for carrying out any one of the above the methods.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

The present description takes the technology and apparatus as disclosed in WO 2010/087698 A2, which is incorporated herein by reference, as a starting point. The international publication discloses a production process for $H_2$, in which a metal boron hydride, $MeBH_4$, is dissolved in water having a conductance of <0.5 µS/cm. The quality of water having such low conductance is qualified as ASTM Type E-1 grade water (Electronics and Semiconductor Grade Water), which is in this description referred to as ultrapure water, UPW. UPW in this description refers to water satisfying the above quality grade and/or water having a conductance of <1 µS/cm, especially <0.5 µS/cm, more especially <0.1 µS/cm, and more especially <0.06 µS/cm. Water having a conductance of <0.06 µS/cm is also being specified as having a resistivity of 18.2 MΩ/cm or larger at 25° C. Further, such solution and such use of a boron hydride fuel is generally in a nitrogen environment to avoid any reaction with moisture and $CO_2$ in ambient air. Below some important parameters for the production of $H_2$ using a metal boron hydride fuel will be discussed.

The present description primarily refers to sodium borohydride ($NaBH_4$) as a metal borohydride. Other examples of a metal borohydride are lithium borohydride ($LiBH_4$) and potassium borohydride ($KBH_4$). However, the method according to the invention is applicable to any metal borohydride, which can be referred to as $Me(BH_4)_y$, in which Me is a metal having a number y of borohydride groups $BH_4$ attached to it. A metal includes any material generally referred to as a metal, including alkali metals, transition metals and complex metals.

Acidity and Reaction Rate

Figure 1:
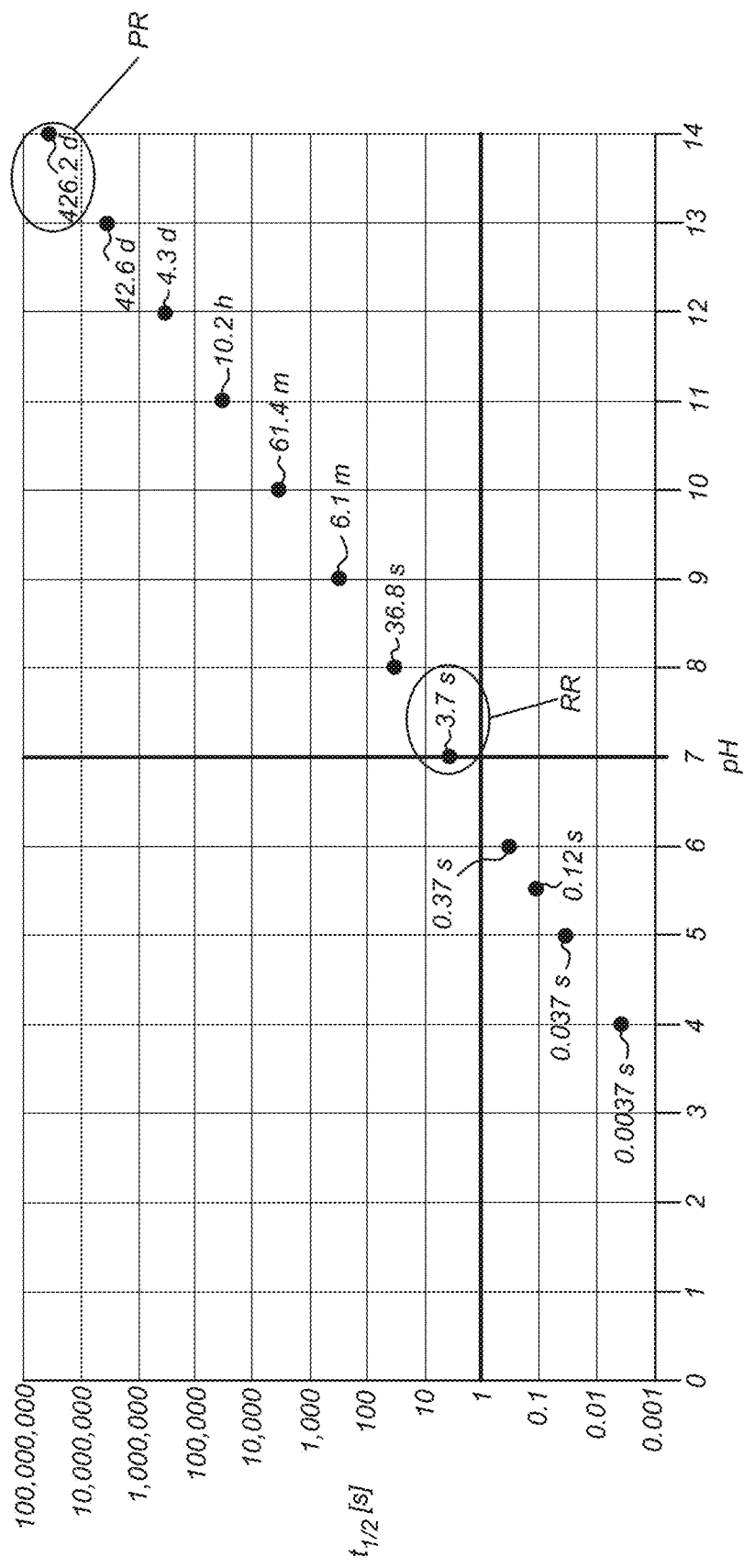
FIG. 1 shows a graph of the influence of the pH value of a stabilized mixture of $NaBH_4$ and NaOH in UPW on the half-time decay value of $NaBH_4$.

The reaction rate in the production of $H_2$ is dependent on the acidity level (pH value) of the borohydride water solution. The Arizona State University has published in 2005 experiments on the reaction rate of $NaBH_4$ with water (Don Gervasio, Michael Xu and Evan Thomas; Arizona State University; Tempe, Ariz.; 26 Jul. 2005; http://fsl.npre.illinois.edu/Project%20Presentation/fuel%20cell%20project_files/July%20workshop%20presentations/uiuc-talk-25July2005.pdf), and results are shown in FIG. 1. The figure has been made based on a table of results published by the Arizona State University. FIG. 1 shows the influence of the pH value of a stabilized solution of NaBH$_4$ in water on the half-time decay value t$_{1/2}$ of NaBH$_4$ in the solution. A metal hydroxide (Me hydroxide) has been used as a stabilizer. The stability of the solution increases with increasing pH value and shows a logarithmic ($^{10}$ log) dependence of the half-time decay value on the pH value. Along the vertical axis the half-time is shown in seconds (s) while in the graph the measurement points have been identified by their half-time value in seconds (s), minutes (m), hours (h) and days (d).

These results show support that for long-term storage a metal borohydride is preferably stored in dry form, so not dissolved in water. For use within days or weeks the liquid metal borohydride can be prepared by dissolving MeBH$_4$ in water, preferably shortly before actual use. Upon use of the fuel within the order of seconds the pH value of the aqueous metal borohydride is to be decreased, preferably at about pH=7 for the pH value. A mixture having such pH value can be referred to as being in the release reaction regime RR shown in FIG. 1. A mixture having a high pH value before it is being transferred to a reaction can be referred to as being in the pre-reaction regime PR as shown in FIG. 1. The RR and PR regimes indicated in FIG. 1 are for illustrative purposes only. The actual pH ranges tied to such regimes will depend on the specific application. This can be done in a space just before the fuel enters a reactor space, where the H$_2$ already being formed can be passed to the outlet.

Solubility and Temperature

The solubility of a metal borohydride, for instance, NaBH$_4$, in ultrapure water, UPW, is, inter alia, dependent on the temperature (https://en.wikipedia.org/wiki/Solubility_table (sodium borohydride)). The following table provides the solubility of NaBH$_4$ in grams per 100 gram UPW:

| Temperature | Solubility |
|---|---|
| 0° C. | 25.0 gram |
| 20° C. | 55.0 gram |
| 40° C. | 88.5 gram |

This implies for the borohydride fuel that the fuel may be a slurry, dependent on the temperature and even at a concentration of 33⅓% wt. The fuel will always be a slurry at a concentration of 66⅔% wt.

This option of 66⅔% wt is preferred since the fuel should be suitable for various types of fuel cells, having in mind the water that is being formed during the reaction in the fuel cell. H$_2$O produced by the fuel cell can be mixed with the fuel to arrive at a desired amount of H$_2$O in the fuel mixture. It is required that the fuel be prepared in a suitable manner for the application, for instance a mobile application, in which it is going to be used.

Frost Protection

Frost protection of the aqueous metal borohydride fuel for a borohydride concentration to be employed can be provided by applying an appropriate metal borohydride to stabilizer ratio in the aqueous fuel (in this description the fuel is also referred to as fuel mixture or fuel solution). One should generally consider a stabilizer concentration that is higher than necessary for the pH value required (Progress in the catalysts for H$_2$ generation from NaBH$_4$ fuel; V. I. Simagina; https://www.google.nl/webhp?sourceid=chrome-instant&rlz=1C1CHWA_nlNL615NL615&ion=1&espv=2&ie=UTF-8#q=Progress+in+the+catalysts+for+H2+generation+from+NaBH4+fuel+V.I.+Simagine%2C+O.V.+Netskine%2C+O.V.+Komova+and+A.M.+Ozerova). The temperature range specified by the US Department of Energy (US DoE) is from −40° C. to 60° C.

A decrease in freezing point temperature can be calculated using $$\Delta T = K * \frac{m}{M}$$

in which K=−1.86 for water;
M=39.99711 g/mol for NaOH,
the solubility of NaOH at 20° C. being 1,070 g/l;
M=37,833 g/mol for NaBH$_4$,
the solubility of NaBH$_4$ at 20° C. being 550 g/l.

Figure 2:
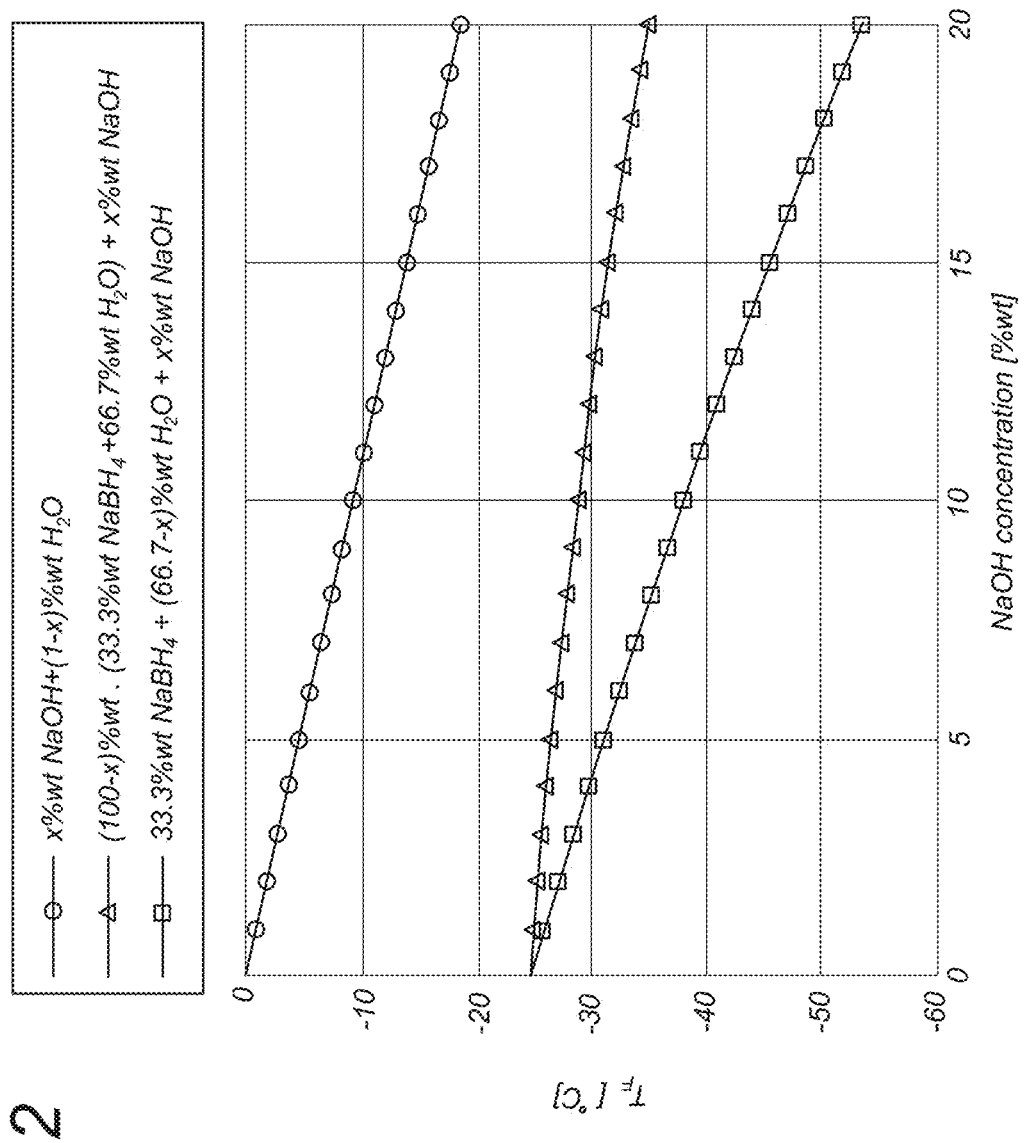
FIG. 2 shows a graph of the influence of the amounts of NaOH and $NaBH_4$ added to UPW on the freezing point $T_F$ of the mixture.

By at least one of adding an amount of NaOH and controlling the fraction by weight of the NaOH that is present in the mixture due to the reaction by controlling the discharge rate, the fraction of UPW decreases in the same amount as the NaOH increases. As a result the fraction by weight of NaBH$_4$ increases as well, which causes a decrease of the freezing point temperature as is shown in FIG. 2. The figure shows the decrease in freezing temperature by adding an x % wt amount of NaOH to water, to a 33.3% wt NaBH$_4$ in water solution, and to a solution of NaBH$_4$ in water while maintaining 33.3% wt NaBH$_4$ in the final mixture.

This fluctuating amount of MeOH present in the aqueous borohydride fuel implies that the reactor requires an active control on the pH value to maintain the pH value at a required level.

The borohydride fuel, for instance a sodium borohydride fuel, can be used in a 33% mixture with a concentration of about 33% wt NaBH$_4$, which, for instance, can be written as (all percentages in relation to the concentration or mixture being percentages by weight (% wt))

33.33% NaBH4+5% NaOH+61.67% UPW or which can be written as 33.33% NaBH4+10% NaOH+56.67% UPW.

A borohydride fuel mixture of MeBH$_4$, MeOH and UPW (H$_2$O) can be optimized such that the mixture has a predetermined freezing point. The ratio of components can be defined as follows for use at higher temperatures:

a NaBH4+b NaOH+c UPW, in which
30%<a<37%, 3%<b<7% and 60%<c<63%, and a+b+c=100%, preferably a=33%, b=5% and c=62%, and the ratio may defined as follows for use at lower temperatures, for instance, down to −40° C.:

d NaBH4+e NaOH+f UPW, in which
30%<d<37%, 7%<e<13% and 50%<f<63%, and d+e+f=100%, preferable: a=33%, b=10% and c=57%.

More concentrated 67% mixtures of the fuel are envisioned with a concentration of about 67%. They may, for example, have the following composition:

67% NaBH$_4$+5% NaOH+28% UPW or:

67% NaBH$_4$+10% NaOH+23% UPW.

Some examples of 33% and 67% mixtures are as follows:

| NaBH$_4$ | NaOH | H$_2$O (UPW) | pH value |
|---|---|---|---|
| 33% mixtures | | | |
| 33.33% | 3% | 63.67% | 13.929 |
| 33.33% | 5% | 61.67% | 13.693 |
| 33.33% | 10% | 56.67% | 13.929 |
| 33.33% | 15% | 51.67% | 13.693 |

| NaBH$_4$ | NaOH | H$_2$O (UPW) | pH value |
|---|---|---|---|
| 67% mixtures | | | |
| 66.67% | 3% | 30.33% | 13.607 |
| 66.67% | 5% | 28.33% | 13.693 |
| 66.67% | 10% | 23.33% | 13.607 |
| 66.67% | 15% | 18.33% | 13.355 |

The half-time value $t_{1/2}$, at about pH=13 is about 42.6 days according to FIGS. 1 and 2. Increasing to pH=13.5 gives a half-time value of about $t_{1/2}$=213 days, which involves the following losses of NaBH$_4$ from the fuel in dependence of the time lapsed after preparation of the fuel:

| time | loss |
|---|---|
| 1 hour | 0.014% |
| 4 hours | 0.054% |
| 8 hours | 0.094% |
| 24 hours | 0.325% |
| 25 hours | 0.338% |
| 29 hours | 0.392% |
| 33 hours | 0.446% |
| 48 hours | 0.649% |
| 3 days | 0.972% |
| 4 days | 1.293% |
| 5 days | 1.394% |
| 7 days | 2.252% |

The above table shows that about 2¼% of the amount of NaBH$_4$ is lost from the fuel within about a week after its preparation. It is therefore advantageous to only prepare the fuel shortly before it will be used in the reactor. Just a smaller quantity of fuel may be prepared for immediate use. One can prepare a mixture of UPW and MeOH, for instance, NaOH, beforehand.

Above only some examples are provided. Very suitable mixtures for producing H$_2$ appear to have an amount of sodium borohydride, NaBH$_4$, in the range of 58 to 72% wt, optionally in the range of 62 to 69% wt, of the mixture, and an amount of sodium hydroxide, NaOH, in the range of 3 to 7% wt, optionally in the range of 4 to 6% wt, of the mixture. The remainder of the fuel mixture is ultrapure water. For a general metal borohydride this can be written in terms of molar percentages (% mol). Generally, a very suitable mixture for producing H$_2$ comprises an amount of borohydride, BH$_4$, groups of the metal borohydride in the range of 45 to 55% mol of the mixture, an amount of hydroxide, OH, groups of the metal hydroxide in the range of 2 to 5% mol of the mixture, and at least substantially UPW for the remainder of the mixture.

The reaction rate can be accelerated by decreasing the pH value of the fuel mixture or by passing the fuel mixture over a catalyst. The reaction can be slowed down by increasing the pH value of the fuel mixture.

Volumetric Storage

Figure 3:
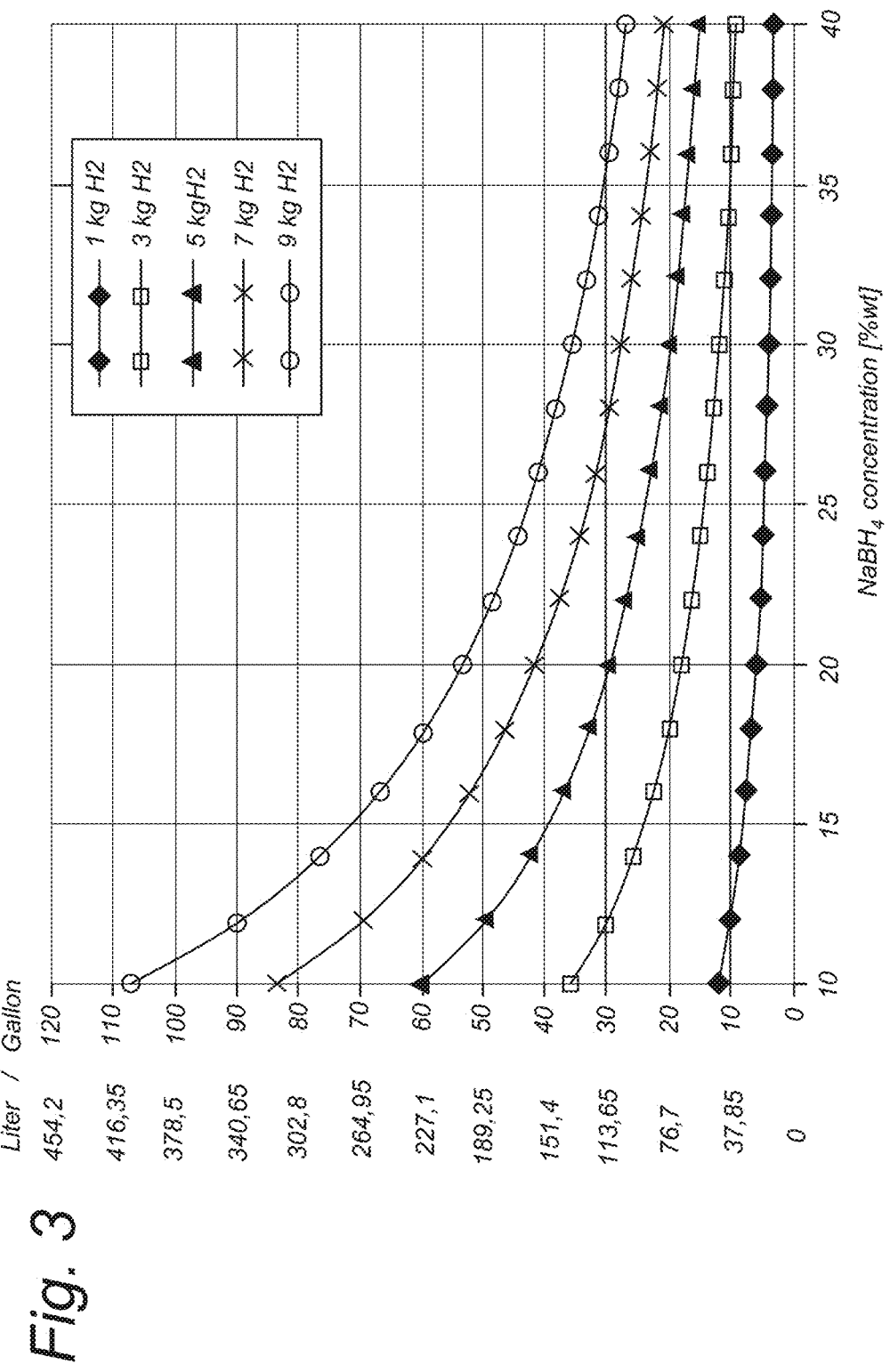
FIG. 3 shows a graph of the dependence of the volume required to store a certain amount of hydrogen on the concentration of $NaBH_4$ (sodium borohydride)

FIG. 3 shows the volume of sodium borohydride (SBH, NaBH$_4$) required at various SBH concentrations to store various amounts of hydrogen according to results by Ying Wu (Hydrogen Storage via Sodium Borohydride, Current status, Barriers and R&D roadmap; Ying Wu; 14 Apr. 2005; https://gcep.stanford.edu/pdfs/hydrogen_workshop/Wu.pdf). The results show the volumetric ratio against the gravimetric storage for sodium borohydride. 30% wt NaBH$_4$ mixture is about 63 g H$_2$/liter. For comparison, liquid H$_2$ is about 71 g H$_2$/liter, and compressed H$_2$ is about 23 g H$_2$/liter and 39 g H$_2$/liter at pressures of 5,000 psi and 10,000 psi, respectively. A 33.3% wt NaBH$_4$ mixture is therefore about equivalent to liquid H$_2$ in stored amount of H$_2$. The advantage of the NaBH$_4$ fuel mixture is that it does not require cooling and does not require high pressures. The above assumes the stoichiometric ratio in the following reaction:

$$\text{NaBH}_4 + 2\text{H}_2\text{O} \xrightarrow{\text{Catalyst}} \text{NaBO}_2 + 4\text{H}_2 \uparrow$$

One should realize that NaBO$_2$ is a dry residue, which is hard to remove during the process.

Accelerators

Various accelerators can be employed for accelerating the reaction of the metal borohydride with water.

Accelerating Catalyst

When NaBH$_4$ is dissolved into ultrapure water (UPW) then the UPW needs to be buffered to obtain a basic solution before the NaBH$_4$ is mixed in. The NaBH$_4$ solution is circulated over a catalyst to release H$_2$ from the NaBH$_4$. In this process NaBH$_4$ is converted to sodium boric oxide (NaB$_x$O$_y$) by release of H$_2$. Preferably, a catalyst is employed which has a carrier, for example, Al$_2$O$_3$, covered with a surface layer comprising platinum, cobalt, ruthenium or a combination thereof.

Accelerating Acid

Preferably, an acid is employed to accelerate the hydrolysis reaction that occurs with UPW (MFTH_110805_DPElectronicS; Phys. Chem. Chem. Phys., 2011, 13, 17077-17083) Hydrochloric acid (HCl) can be used when sodium is the base metal since it is a rather cheap, efficient and widely used acid. HCl dissolved in UPW provides H$^+$ and Cl$^-$ ions. The chemical reaction with the borohydride can be as follows:

$$\text{BH}_4^- + \text{H}^+ + 3\text{H}_2\text{O} \rightarrow \text{B(OH)}_3 + 4\text{H}_2$$

In case of a stoichiometric ratio this could read:

$$2\text{BH}_4^- + 2\text{H}^+ + 3\text{H}_2\text{O} \rightarrow \text{B}_2\text{O}_3 + 8\text{H}_2$$

This leaves Na$^+$ and Cl$^-$ ions in the same amounts in the solution. The remainder of the UPW in the solution may evaporate due to the reaction heat that is released in the chemical reaction to provide NaCl together with various boron oxides.

Some scientists (Progress in the catalysts for H$_2$ generation from NaBH$_4$ fuel; V.I. Simagina; https://www.google.nl/webhp?sourceid=chrome-instant&rlz=1C1CHWA_nINL615NL615&ion=1&espv=2&ie=UTF-8#q=Progress+in+the+catalysts+for+H2+generation+from+NaBH4+fuel+V.I.+Simagine%2C+O.V.+Netskina%2C+O.V.+Komova+and+A.M.+Ozerova) indicate that BH$_3$ can be formed, which is converted into B$_2$H$_6$. B$_2$H$_6$ reacts with water to release H$_2$ and to form boron acid, which provides another reason to use an excess amount of water in the reaction.

The pH value of the mixture can be made neutral in the reactor in which an acid is employed, after which the acid is added to further reduce the reaction time. The amount of acid to be added is basically equal to the amount of MeOH in the mixture.

Comparison of the Use of an Acid and a Catalyst

Employing an acid provides a rather high reaction rate as an advantage, while the disadvantages are having an additional element in the process, an increase in costs and weight, and a more difficult reuse of materials. Employing a catalyst advantageously saves on costs and weight, while the disadvantage is having a slower reaction rate. By employing both a catalyst and an acid the advantage of having a higher reaction rate can be balanced against the disadvantages of having an additional element in the process, an increase in costs and weight, and a more difficult reuse of materials.

Per application a desired selection is made, balancing the pros and cons. In relation to WO 2010/087698 A2, the selection will have an impact on the amount of gas stored.

Reaction Products

Reaction products from the reaction of the metal borohydride end of in a so-called spent fuel. In case of an abundance of UPW the following reaction products are present (Don Gervasio, Michael Xu and Evan Thomas; Arizona State University; Tempe, Ariz.; 26 Jul. 2005; http://fsl.n-pre.illinois.edu/Project%20Presentation/fuel%20cell%20project_files/July%20workshop%20presentations/uiuc-talk-25July2005.pdf):

| boron oxide | mole oxygen (per $NaBH_4$) [moles] | $H_2O$ required (add on 30% solution) [moles] | volume of $H_2O$ [millilitre] |
|---|---|---|---|
| *$NaB(OH)_4$ | 4 | 32 | 576 |
| $NaBO_2$—$xH_2O$** | 2 + x | 16 | 288 |
| $Na_2B_4O_7$ | 7/2 | 28 | 504 |
| $Na_2B_4O_7$—$10H_2O$ | 17/2 | 68 | 1224 |
| $Na_2B_4O_6(OH)_2$—$3H_2O$ | 11/2 | 44 | 792 |
| $Na_2B_4O_7$—$5H_2O$ | 12/2 | 48 | 864 |
| $NaB_4O_5(OH)_4$—$3H_2O$ | 12/2 | 48 | 864 |
| $NaB_4O_5(OH)_4$—$8H_2O$ | 17/2 | 68 | 1224 |

*X-ray diffraction data of the Arizona State University indicate that $NAB(OH)_4$ is the by-product of the hydrolysis reaction (Don Gervasio, Michael Xu and Evan Thomas; Arizona State University; Tempe, AZ; 26 Jul. 2005).
**Progress in the catalysts for $H_2$ generation from $NaBH_4$ fuel; V. I. Simagina (Hydrogen on Demand)

Reaction Process

The maximum reaction is at a process in which the ratio of $H_2O$ to borohydride groups ($BH_4$) in the metal borohydride ($Me(BH_4)_y$), for instance, $NaBH_4$, is at least 5 to 2. This has been described in a Dutch patent application filed on 6 Mar. 2016 and invoking priority of Dutch patent application NL 2015742. Preferably, a larger amount of water is used to keep the mixture after the reaction in a liquid state. As an example 1 kg of $H_2$ is used in $NaBH_4$. A possible borohydride fuel composition of 33.33% wt $NaBH_4$ and 5% wt NaOH consists of:

9.38 kg $NaBH_4$, which is 248.05 mole
1.41 kg NaOH, which is 35.19 mole
17.36 kg UPW, which is 936.69 mole For a ratio of $H_2O$:$NaBH_4$ of 2:1 the 17.36 kg of UPW is sufficient. To have a ratio of $H_2O$:$NaBH_4$ of 5:1 an amount of 22.34 kg UPW is required. To obtain such amount the UPW provided should be supplemented with 70% of the theoretically produced water from the fuel cell, being 6.25 kg. In a stationary application this will not pose a problem.

Reactor

Various reactor embodiments can be employed for the reaction of metal borohydride yielding hydrogen gas. The metal borohydride fuel ($MeBH_4$/MeOH/UPW mixture) is also referred to as H2Fuel in the description and the drawings.

Reactor Embodiment 1: A Reactor Embodiment Having an Accelerating Acid

Figure 4:
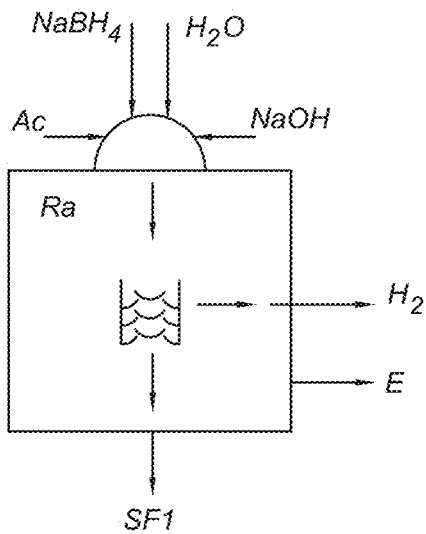
FIG. 4 shows a schematic representation of an acid reactor type.
Figure 7:
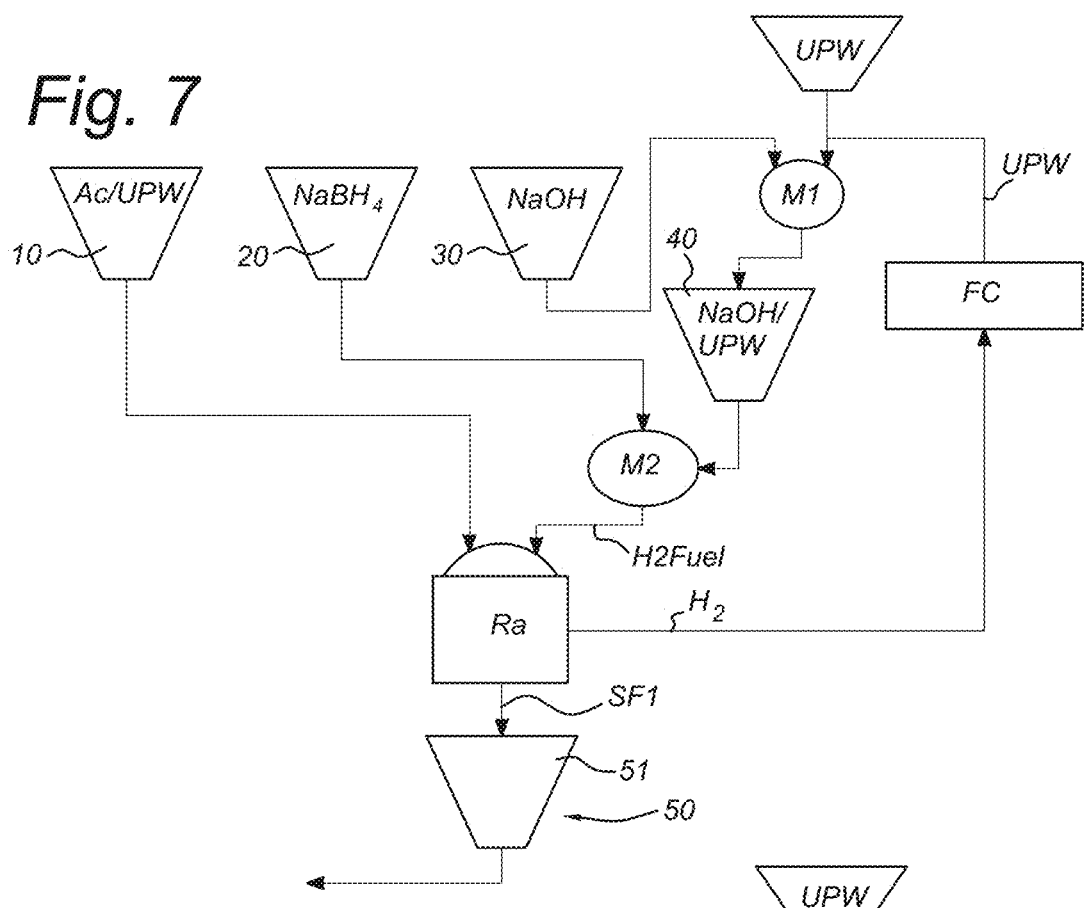
FIG. 7 shows a schematic representation of an acid reactor type process flow.

FIGS. 4 and 7 show a schematic representation of a first exemplary reaction in which an acid Ac, for instance, HCl, is supplied. The acid may be supplied together with water. The fuel is mixed in the reactor Ra with the accelerator comprising an acid Ac, HCL in the example, and UPW. The maximum mixing ratio, providing a fast response, of an Na, containing molecule to 1 $Cl+H^++OH^-$; $3H_2O$ is producing a low overall weight percentage of Hz. This will not be a disadvantage in a stationary application, but it will raise costs. The minimum mixing ratio, providing a response equal to the half-time at the pH value of the mixture, is NaOH:HCL=1:1, and releasing at least $2.5H_2O$.

To allow correctly dosing the amount of water added part of the water is recaptured from the liquid from the fuel cell FC. Mixing is done in a mixing chamber to obtain a proper mixing and to obtain a heat yield at a concentrated location so that the heat can be better discharged. Heat is generated in the reactor in the amount of 53.8 MJ per $kgH_2$, which is discharged by a cooling fluid. The heat discharged can be used in another application or in the synthesis. Boron oxide is discharged together with other reaction products in a spent fuel mixture SF1.

FIGS. 4 and 7 depict a schematic representation of an embodiment of the acid reactor process. FIG. 7 shows a stock of an acid/UPW mixture 10 (mixture of an acid Ac and UPW); a stock of dry $MeBH_4$ 20; a stock of MeOH 30; a stock of an MeOH/UPW mixture 40; a first mixing chamber M1 for providing a mixture of MeOH and UPW; a second mixing chamber M2 for providing a mixture of $MeBH_4$, MeOH and UPW from separate supplies of dry $MeBH_4$ and MeOH/UPW mixture into the second mixing chamber M2 to provide an $MeBH_4$/MeOH/UPW fuel mixture having selected percentages (by weight) of $MeBH_4$ and MeOH; an acid reactor chamber Ra having respective buffer chambers for $H_2$ gas and spent fuel SF1; a storage tank 51 for spent fuel SF1; and a fuel cell FC. Alternatively, all separate stocks of UPW, acid and metal hydroxide may also be employed and mixed during use to arrive at desired mixing ratios.

In a semi-direct use the mixing of MeOH, UPW and $MeBH_4$ may also take place at the "gas" (fuelling) station. FIG. 4 generally shows that an acid Ac, a metal borohydride ($NaBH_4$ in the example), $H_2O$ and a metal hydroxide (NaOH in the example) are supplied to the reactor Ra, which can be provided into reaction process as required. The acid can be supplied to promote and accelerate the H2 production process, and the metal hydroxide can be supplied to slow down or stop the process. They may also be supplied for yielding desired other reaction products. The embodiment of the acid reactor process of FIG. 7 is provided with a reactor chamber Ra in which the acid/UPW mixture is mixed with the $MeBH_4$/MeOH/UPW fuel mixture H2Fuel. The resulting mixture is circulated within the reactor chamber. The pH value of the $MeBH_4$/MeOH/UPW fuel mixture is decreased by mixing with the acid/UPW mixture to a pH value of, for instance, pH=6-7, such that reaction times for generating $H_2$ are sufficiently fast in line with the half time values applicable, as discussed earlier.

The $H_2$ generated is passed to the fuel cell FC for the production of electrical energy by reaction with $O_2$ to $H_2O$. The $H_2O$ resulting from the chemical reaction in the fuel cell generally qualifies as ultrapure water (UPW) and is passed to the first mixing chamber M1 to provide an MeOH/UPW mixture having a selected percentage (by weight) of MeOH. In case the $H_2O$ produced would not be UPW, it can be filtered or otherwise treated to become UPW. By using the $H_2O$ from the fuel cell it is not required to keep a separate storage of UPW, which saves weight, space and costs.

Spent fuel SF1 is passed from the reactor chamber Ra to a spent fuel storage tank 51 that can be part of a larger tank 50. The spent fuel can be recycled.

Reactor Embodiment 2: A Reactor Embodiment Having an Accelerating Catalyst

Figure 5:
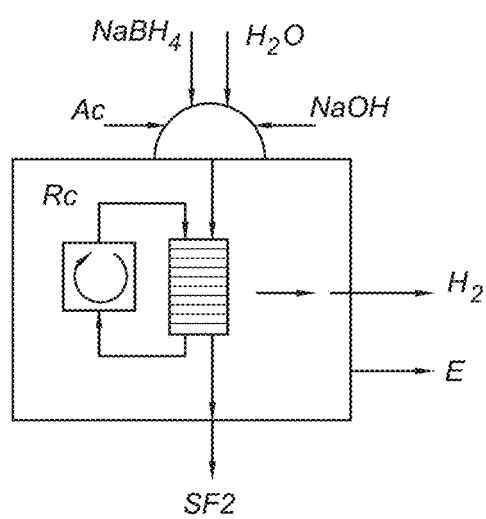
FIG. 5 shows a schematic representation of a catalyst reactor type.
Figure 8:
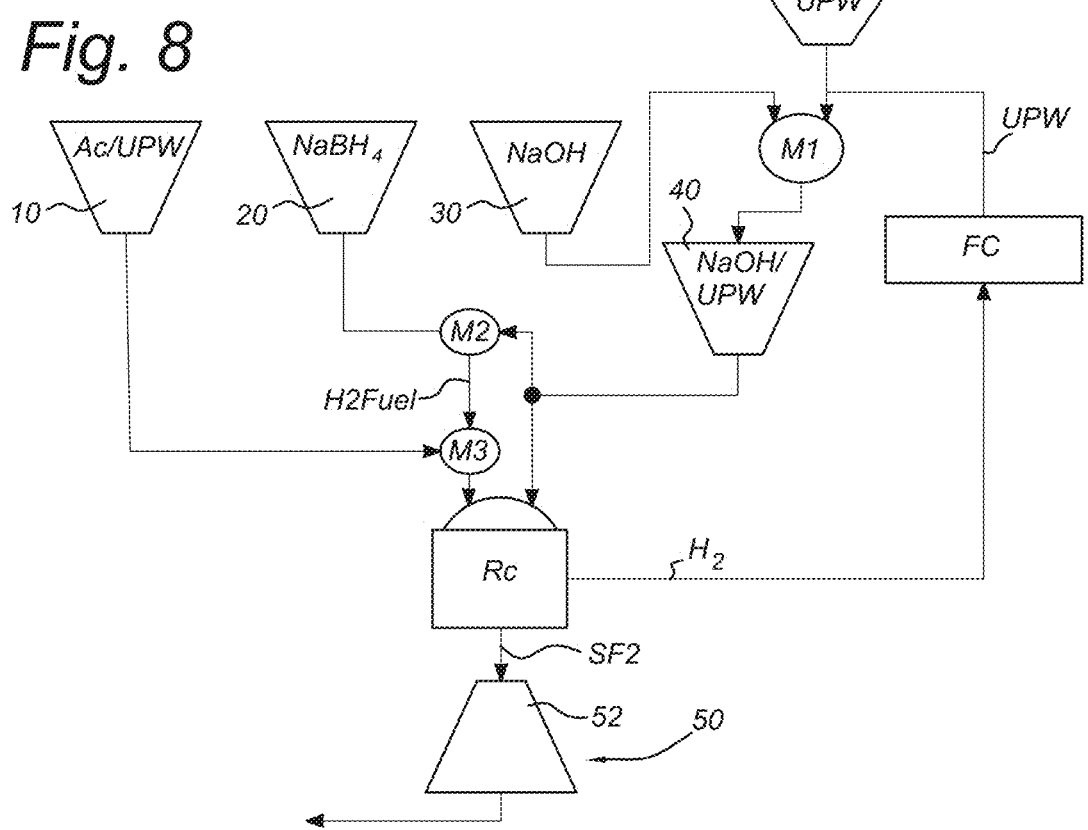
FIG. 8 shows a schematic representation of a catalyst reactor type process flow.

FIGS. 5 and 8 shows a schematic representation of a second exemplary reaction process in which a catalyst is employed as an accelerator. The reactor comprises a reaction chamber Rc in which the actual reaction takes place. The reaction occurs over a catalyst that releases hydrogen gas from the metal borohydride. In order to increase the reaction rate it is preferred that the pH value of the fuel mixture H2Fuel is lowered in accordance with FIG. 1. Each component is discharged in its own appropriate manner. A supply of acid Ac is therefore available.

A continuous mixing occurs over the catalyst in the reaction chamber by circulating the H2Fuel. A pressure decrease to the open discharge of the spent fuel SF2 to the receiving chamber is measured, powered and monitored. Each part may have its own measurement and control. Discharge of hydrogen gas is realized at another higher level, as is discussed in WO 2010/087698 A2.

FIG. 8 depicts a schematic representation of an embodiment of a catalytic reactor process. The catalytic reactor process embodiment shares quite a few elements with the acid reactor process embodiment of FIG. 7, as is obvious from the figures, the functioning of which is the same. The catalytic reactor process comprises a catalytic reactor chamber Rc. The $MeBH_4$/MeOH/UPW fuel mixture H2Fuel is mixed in-line in mixer M3 with the acid/UPW mixture to obtain a desired pH value of, for instance, pH=7-9, preferable 7, of the fuel mixture and is subsequently provided into the catalytic reaction chamber Rc. The MeOH/UPW mixture is also provided into the (relatively slow) catalytic reaction chamber Rc to allow slowing down the reaction rate by adding additional metal hydroxide. The embodiment of the catalytic reactor process of FIG. 8 is provided with a catalytic reactor chamber Rc having a catalyst based on a carrier with, for example, cobalt. The fuel mixture with $MeBH_4$ should be circulated a sufficient amount of time over the catalyst, for instance, by passing the fuel mixture several times over the catalyst, to obtain $H_2$. By decreasing the pH value of the fuel mixture to, for instance, pH=7, the total process time is reduced. A different composition of spent fuel SF2 will result as compared to the spent fuel from an acid type reactor. The spent fuel SF2 from the catalytic reactor Rc is collected in a spent fuel storage tank 52 that may be part of a larger tank 50.

Figure 6:
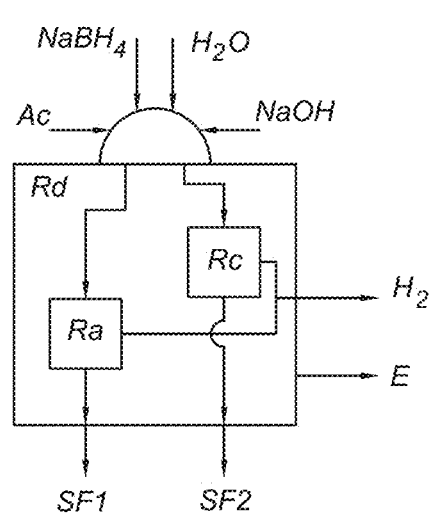
FIG. 6 shows a schematic representation of a dual reactor type.
Figure 9:
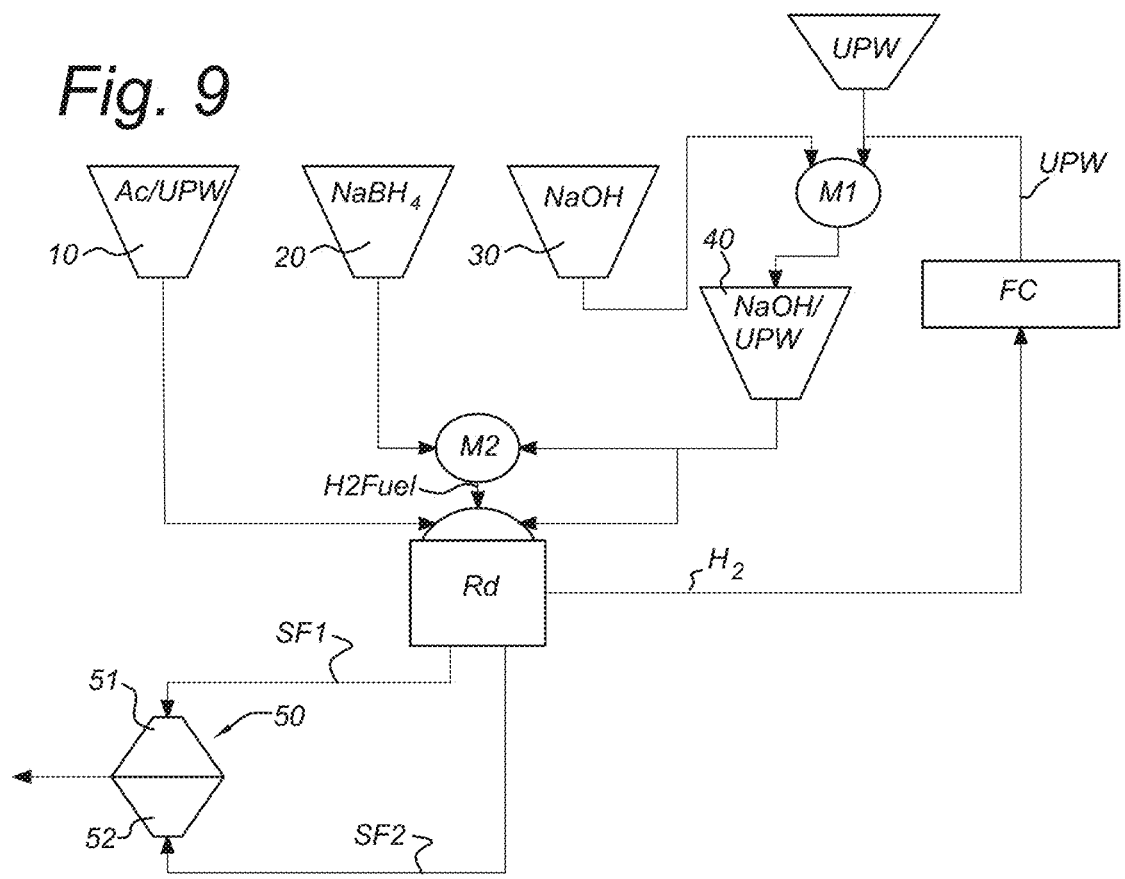
FIG. 9 shows a schematic representation of a dual reactor type process flow.

Reactor Embodiment 3: A Reactor Embodiment Having a Combination of an Acid and a Catalyst as Accelerators FIGS. 6 and 9 show a schematic representation of a combination or dual type of reactor Rd, which is a combination of reactor embodiments 1 and 2 above. The $3^{rd}$ reactor process embodiment comprises two separate mixers at the inlets, which is not actually shown as such. The hydrogen gas outlets of both mixers discharge in a common gas storage having one outlet. The spent fuel of both mixers can be channelled to two separate spent fuel storage chambers 51, 52, each with its own outlet, or to one common spent fuel storage chamber 50.

FIG. 9 depicts a schematic representation of a dual reactor type comprising a dual reactor Rd having two reaction chambers, an acid reaction chamber and a catalytic reaction chamber. Such a dual reactor type can be advantageous to compensate for the slow response time of the catalytic reactor as compared to the acid reactor. The dual reactor type embodiment again shares quite a few elements with the acid reactor type embodiment of FIG. 7 and the catalytic reactor type embodiment of FIG. 8, as is obvious from the figures, the functioning of which is the same as already described.

The relatively slow response time can be compensated for by having a larger Hz gas storage in between reactor Rc and its use, for instance, in a fuel cell. The slow response can also be compensated for by employing a dual rector system Rd as shown in FIG. 9. In a catalytic process in the catalytic reactor a hydrogen atom is being replaced by a hydroxide from $H_2O$, which causes an increase of the pH value of the fuel mixture. This will cause an increase in the half-time value of the reaction rate (see FIG. 1), leading to slowing down of the reaction. Further, the pH value will increase due to a reaction between $H_2O$ and $MeBH_4$., which may result in an increase of the pH value from about pH=7 to about pH=11. Both mechanism thus cause an increase in pH value of the fuel mixture H2Fuel and thus a slowing down of the reaction rate. The reaction rate can be kept at a constant level or be controlled to a desired reaction by adding an amount of acid for decreasing the pH value again to a level to obtain a desired reaction rate. A decrease of the pH value from, for instance, pH=11 to pH=9 will already have a large influence on the reaction rate. An acid can also be employed to increase the response time of the reactor when a sudden increase in $H_2$ generation is required.

Various catalysts can be employed in the catalytic and dual reactor types. Some examples are Indanthrene Gold Orange, Perylene TCDA, Perylene diimide, Co powder, Indanthrene Yellow, Zn phtalocyanine, Indanthrene Black, Quinacridone, Pyranthrenedione, Isoviolantrone, Indigo, Indanthrene, Ni phthalocyanine, No catalyst, Cu phthalocyanine, Ditridecyl-3,4,9,10-perylenetetracarboxylic diimide, Dimethoxyviolanthrone, Poly(methylmethacrylate), 1,4-Di-keto-pyrrolr(3,4-C)pyrrole, 3,4,9,10-perylenetetracarboxylic dianhydride, Perylenetetracarboxylic diimide, and Phosphate buffer pH 11. However, this list is far from complete.

The dual reactor may have respective buffer chambers for hydrogen gas and spent fuel. The storage tank 50 for spent fuel SF1, SF2 of the dual reactor type may have separate tanks 51, 52 or a common tank 50 for storing spent fuel from the acid and catalytic reactions, respectively.

Figure 10:
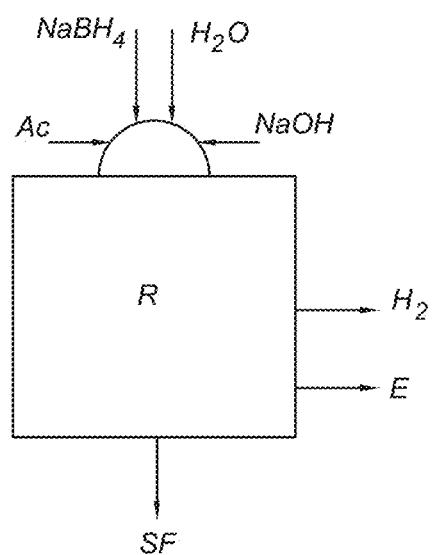
FIGS. 10 and 11 show a schematic representation of a generalized reactor type.
Figure 11:
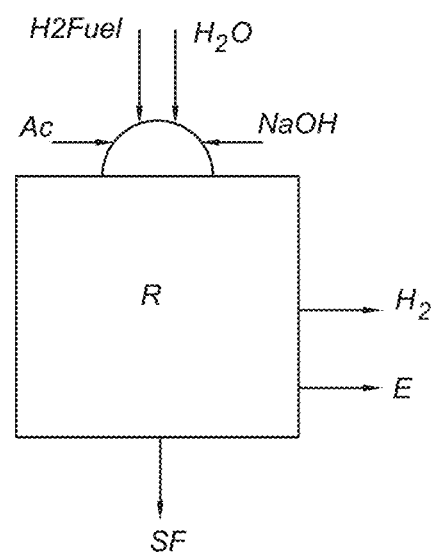

FIGS. 10 and 11 show more generalized reactors and supply of reactants. The reactor R can be an acid type reactor Ra, catalyst type reactor Rc or dual type reactor Rd. The metal borohydride, $NaBH_4$ as an example in FIG. 10, may be supplied as such as shown in FIG. 10, but may also be supplied in a mixture indicated as H2Fuel in FIG. 11. H2Fuel may be any suitable mixture of the metal borohydride, for example in a mixture of the metal borohydride and $H_2O$ stabilized with a metal hydroxide, such as a $NaBH_4$/$NaOH$/$H_2O$ fuel mixture. The acid AC and metal hydroxide, NaOH in FIGS. 10 and 11, may also be supplied in a mixture with, for instance, $H_2O$.

Fuel Mixture Preparation

Figure 12:
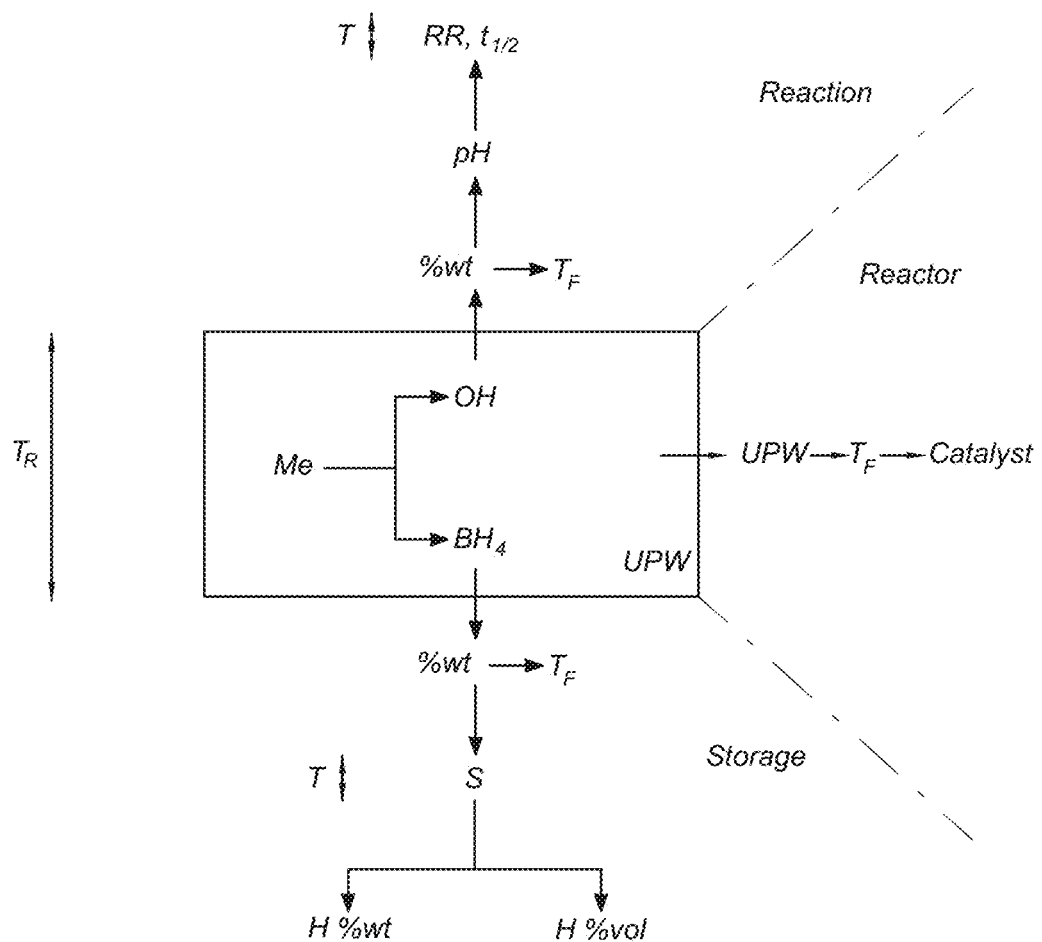
FIG. 12 shows an overview of various process parameters and their influence on the process.
Figure 13:
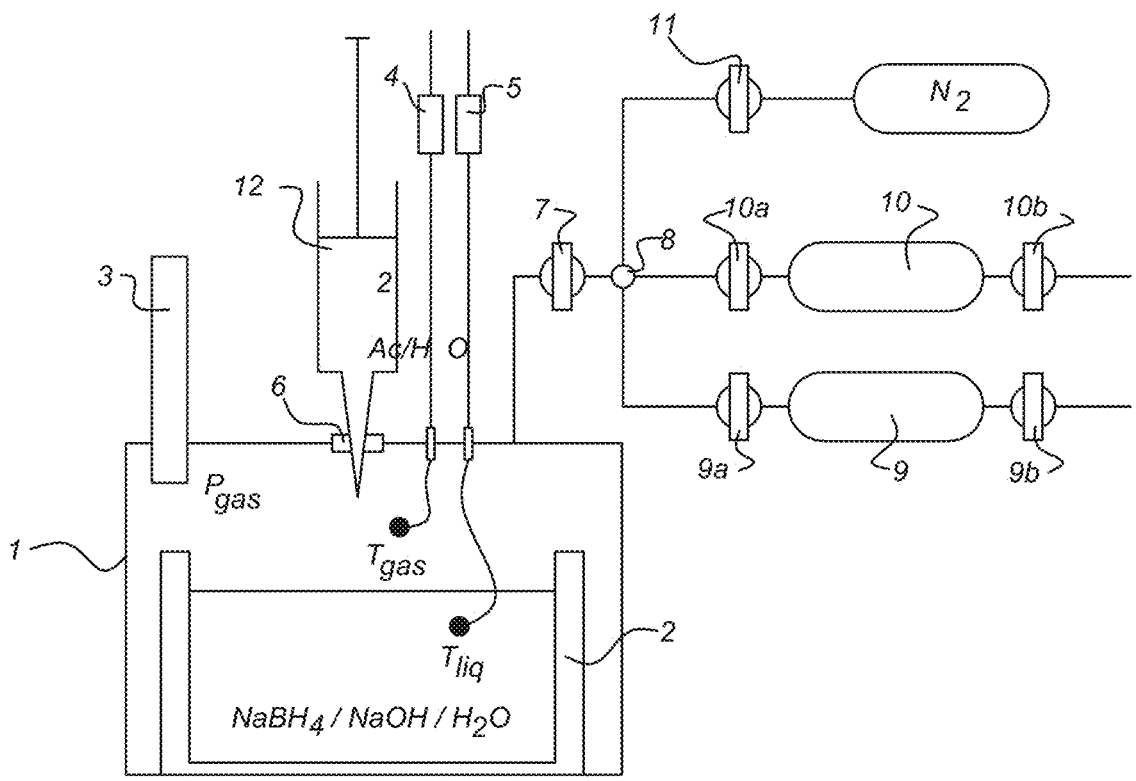
FIG. 13 schematically depicts the reaction setup of experiments carried out.
Figure 14:
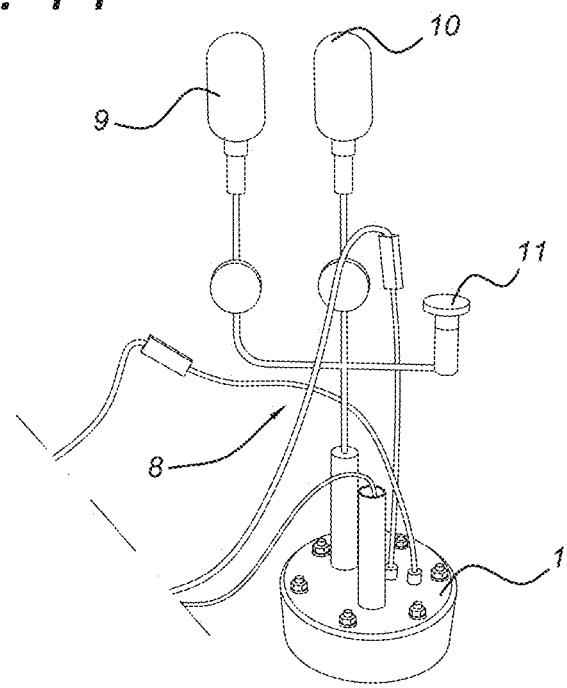
FIGS. 14, 15 and 16 show pictures of the reaction setup of experiments carried out.
Figure 15:
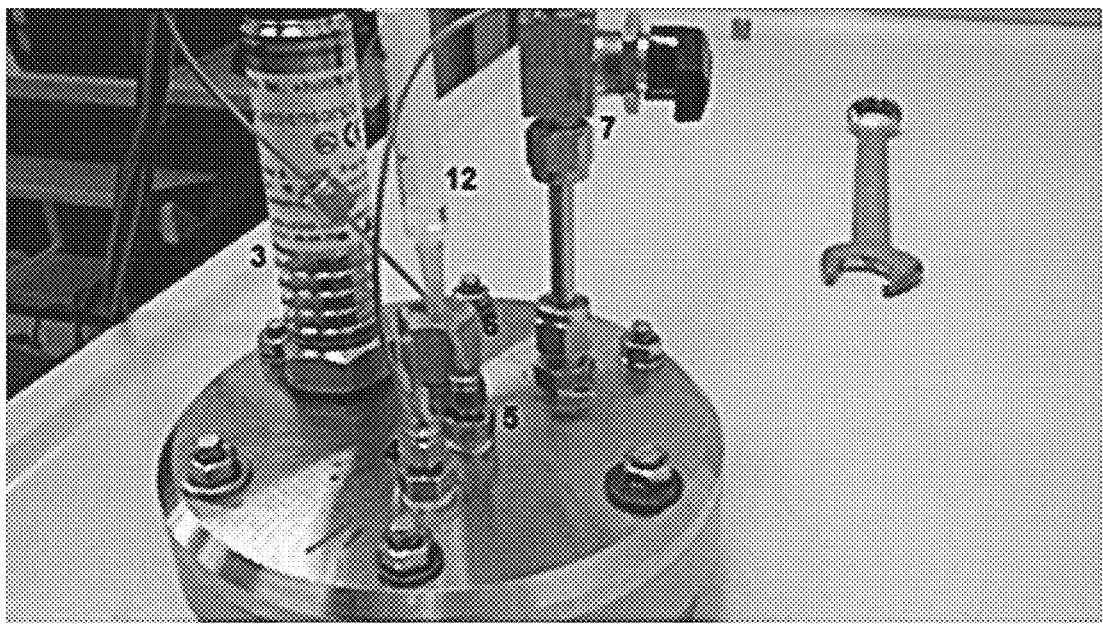
Figure 16:
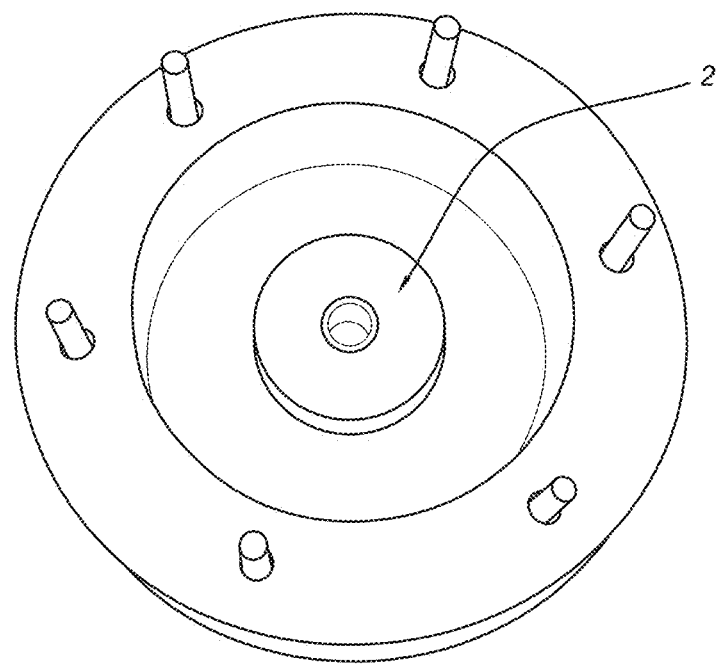

FIG. 12 shows an overview of various parameters that have an impact on the reaction to produce Hz, from a metal borohydride. A dry storage of $MeBH_4$ is preferred for the longer term since it can be stored in dry form for years while no deterioration will occur in case it is kept under humid free conditions. Further, in the dry state it can be easily supplied to a location for actual use. At the location of actual use the fuel mixture can be prepared according to the desired requirements.

Taking a dry metal borohydride as a starting point, a first step would be to mix ultrapure water, UPW, with a metal hydroxide, so as to obtain a mixture with a desired pH value. The purity level of the water plays an important role, as has been disclosed in WO 2010/087698 A2, in the release of $H_2$ in the reaction of the hydrogen atom in the hydride and a hydrogen atom of the water. The desired pH value of the mixture is chosen in dependence of, inter alia, the desired reaction rate RR and reaction time, storage time before use in the reaction, temperature at use and in storage, and/or stationary or mobile use of the fuel mixture. The metal hydroxide is to be added to and mixed with UPW in such a manner that the solution does not contain any particles or flakes. A choice of the form of metal hydroxide will also dependent on its cost level.

The metal hydroxide acts as a stabilizer for the metal borohydride that is added at a later moment to the mixture. The amounts of metal hydroxide and metal borohydride added to the UPW determine a freezing point of the fuel mixture, and therefore its suitability of use under summer-like, winter-like or other types of conditions. The amount of metal borohydride added is also to be determined based on its solubility S.

The pH value (level of acidity) can be changed by adding an appropriate acid. HCl can be a good choice, but any other suitable acid may be employed. One may store all constituents of the fuel mixture separate and prepare the fuel mixture from the separate constituents metal borohydride, metal hydroxide, acid and UPW when required. When using a catalyst one preferably does not use an acid in a steady state since it increases costs and may deteriorate the catalyst. FIG. 12 further shows the parameters that are of influence in the reactor. The temperature $T_R$ of the reactor at which the reaction takes place has its influence on the reaction rate. The temperature T is also shown as a parameter for the reaction in dependence of the pH level and the solubility S.

The metal, Me, in the metal borohydride and the metal hydroxide is most preferably the same metal. The description mostly refers to $NaBH_4$, NaOH and NaCl. However, Na can be replaced by any other metal, which metal is generally referred to as Me in the chemical formulas in the description. The metal Me refers to any material usually referred to as a metal, including alkali metals, transition metals, complex metals, etc. Further examples of such metals are, for instance, lithium (Li), potassium (K), magnesium (Mg) and aluminum (Al).

EXPERIMENTS

Below experiments and experimental results are discussed on the preparation of a fuel mixture for producing $H_2$ and the production of $H_2$ from the fuel mixture. Details are provided of the materials used, the reaction setup, the experiments and the results thereof.

Materials

All chemicals were purchased from Sigma-Aldrich except for the ultrapure water (UPW), which was obtained from the Pure Water Group. The following chemicals were used to prepare fuel and activator solutions:

| Chemical | Grade | Purity | Order no. | Batch no. |
|---|---|---|---|---|
| sodium borohydride | granular, 10-40 mesh | 98% | 452874 | MKBR3579V |
| sodium hydroxide | reagent grade, pellets | ≥98% | S5881 | SZBF0550V |
| hydrochloric acid concentrate | for 1 L standard solution, 0.5M HCl (0.5N) | | 38285 | SZBF0560V |
| ultrapure water (UPW) | ASTM type E-1 | | | |

The alkaline solution was prepared by taking 30.837 gram UPW in a beaker and adding 2.505 gram of NaOH and stirring the resulting mixture until all NaOH pellets were dissolved completely.

The activator solution was prepared by mixing hydrochloric acid concentrate with the same amount of ultrapure water. 75.637 gram of hydrochloric acid concentrate was weighed in a beaker. 75.633 gram of UPW was weighed in another (different) beaker, and the hydrochloric acid was added to the UPW. Both beakers were flushed with the solution to ensure a homogeneous solution.

5 gram of fuel (also referred to as fuel mixture or fuel solution) was prepared by mixing 3.331 gram of alkaline solution with 1.666 gram of sodium borohydride. The mixture was stirred until no solids remained in solution. A short heating (a few seconds on a heating plate) of the mixture helped dissolving the solid. The pH value of the fuel solution was determined to be pH=13.5. The final composition of the $H_2$ generating fuel used in the experiments is given below:

| Compound | Amount (gram) | % wt |
|---|---|---|
| $NaBH_4$ | 1.666 | 33.34 |
| NaOH | 0.250 | 5.00 |
| UPW | 3.081 | 61.66 |
| Total: | 4.997 | 100.00 |

Reaction Setup

The reaction setup is shown in FIGS. 13 to 16. The reactor setup comprises a stainless steel reaction vessel 1 (having a volume of 182.4±1.5 ml) with a Teflon insert 2. The Teflon insert 2 is the actual reaction mixture container and is replaced with a new one in each reaction. On top of the reaction vessel are provided a pressure sensor 3, temperature sensors 4, 5 (thermocouples) for gas and liquid phases, respectively, a septum 6 and a valve 7. The sensor 3, 4 and 5 were connected to a data acquisition computer.

The specifications of the pressure sensor and the temperature sensors used are given below:

| Designation | Sensor type | Range | Calibrated range | Accuracy |
|---|---|---|---|---|
| Pressure | AE sensors ATM 2.5 bar abs | 0-2.5 bara | 0-2.4 bara | 0.0125 bara |
| Temperature reaction medium | Omega engineering Type T | −250-350° C. | 0-100° C. | 1.4° C. |
| Temperature gas medium | Omega engineering Type T | −250-350° C. | 0-100° C. | 1.4° C. |

The sensors were calibrated and the calibration logs are given in the tables below:

Pressure sensor
Results of polynomial fit of input data set.
Fitted to function: $Y = a + b \cdot X$
$a = -3.33977748360518E+0001$ CC = 0.999993998801983
$b = 2.51274942241271E+0004$ Linearity: +0.169%; −0.185%
STATISTICS

| input: | 10 points | output: | 10 points |
|---|---|---|---|
| minimal X value: | 7.69999E−01 | maximal error LSO: | 0.44010720% |
| maximal X value: | 9.5990000 | average error LSO: | 0.16192703% |
| minimal Y value: | 1.92600E+04 | maximal error FSO: | 0.18505821% |
| maximal X value: | 2.40960E+05 | average error FSO: | 0.07577616% |
| | | standard deviation: | 261.38961904 |

Temperature liquid reaction medium ($T_{liq}$) thermocouple signal amplifier
Results of polynomial fit of input data set.
Fitted to function: $Y = a + b \cdot X$
$a = 2.73696307682517E+0002$ CC = 0.999978525273946
$b = 1.50113170585922E+0001$ Linearity: +0.047%; −0.146%
STATISTICS

| input: | 11 points | output: | 11 points |
|---|---|---|---|
| minimal X value: | 0.00000E+00 | maximal error LSO: | 0.19960360% |
| maximal X value: | 6.6420000 | average error LSO: | 0.04954811% |
| minimal Y value: | 273.1500000 | maximal error FSO: | 0.14630571% |
| maximal X value: | 373.1500000 | average error FSO: | 0.04024681% |
| | | standard deviation: | 0.22911342 |

Temperature gas reaction medium ($T_{gas}$) thermocouple signal amplifier
Results of polynomial fit of input data set.
Fitted to function: $Y = a + b \cdot X$
$a = 2.72150413620245E+0002$ CC = 0.999999761705112
$b = 1.50265967609884E+0001$ Linearity: +0.012%; −0.006%
STATISTICS

| input: | 11 points | output: | 11 points |
|---|---|---|---|
| minimal X value: | 6.55000E−02 | maximal error LSO: | 0.01282300% |
| maximal X value: | 6.7220000 | average error LSO: | 0.00551510% |
| minimal Y value: | 273.1500000 | maximal error FSO: | 0.01179027% |
| maximal X value: | 373.1500000 | average error FSO: | 0.00469818% |
| | | standard deviation: | 0.02412944 |

The valve 7 is connected to a quadruple connector 8. Two gas chromatography (GC) vials 9, 10 of 50 ml each are connected to the quadruple connector 8 with respective valves in between vial and connector. Further, another valve 11 is connected to the quadruple connector 8 for enabling the addition and evacuation of gases to and from the reaction vessel 1.

Before experiments were started, tubing and GC vials were under vacuum. Once the insert with the fuel in it was placed in the reaction vessel 1, the tubing and the reaction vessel were filled with nitrogen (purity grade N50, Air Liquide) at atmospheric pressure. Air was removed by alternatingly adding nitrogen (5 bar) and applying vacuum for three consecutive times, then pressurizing with nitrogen (5 bar) and finally open the gas evacuation valve until the pressure inside the vessel equalled ambient pressure. With the reaction setup containing fuel and being filled with nitrogen, the setup is ready for activator injection by a syringe 12 passing through the septum 6 into the insert 2 inside the reaction vessel 1.

Execution of Experiments

The $H_2$ generation experiment was performed three times on 29 Oct. 2015 following the protocol 15EM/0678 of the institute TNO in the Netherlands. Fuel is inserted in the insert 2, and the reactor 1 is filled with nitrogen as described previously. To add the activator solution, the following steps were executed. First, a clean, disposable syringe 12 (having a volume of 2 ml) was equipped with a disposable stainless steel needle (having an inner diameter of 0.9 mm). The syringe was flushed with the activator solution, leaving no air in the syringe or needle. The mass of the flushed syringe was determined. The balance was tared with the syringe, and the syringe was filled with the required amount of activator (also referred to as activator solution or activator mixture). The mass of syringe plus activator was determined. Next, the syringe was emptied slowly (in the course of 20-40 seconds) into the Teflon insert 2 by injecting it through the septum 6, without letting any gas enter the syringe or needle. When addition of the activator was complete the syringe was removed and weighed. The exact amount of activator added was determined by subtracting the weight of the emptied syringe from the combined mass of syringe and activator. The exact amounts of fuel and activator added in the experiments are given below:

| Experiment reference | Fuel [gram] | Activator [gram] |
|---|---|---|
| YPEvG119 | 0.2008 | 0.3352 |
| YPEvG120 | 0.1993 | 0.3331 |
| YPEvG121 | 0.2001 | 0.3554 |

The GC vials were filled with the gas mixture from the reaction vessel about 30 minutes after the pressure in the vessel was considered stable (typically about 15 minutes after addition of the activator was completed). Experiment YPEvG119 was terminated earlier due to a malfunction of the data acquisition software. The total data recording time from the moment of addition of the activator was 1,610 seconds (26.7 minutes). The experiment showed a stable pressure in the reaction vessel and hence the experiment was considered successful. The GC vials were filled by opening the valves connecting the vials to the quadruple connector and the reaction vessel. Due to the maintained vacuum in the vials, they quickly filled with the gas phase when their respective valves were opened. The filled vials were allowed to equilibrate for 5 minutes, then their respective valves were closed and the vials were sent to be analyzed by gas chromatography (GC).

After filling the GC vials, any excess pressure in the reaction vessel was released and the vessel was opened. The Teflon insert was removed. The solid left behind in the insert 2 was dried in a vacuum stove at 30° C.

Pressure and Temperature Profiles

Figure 17:
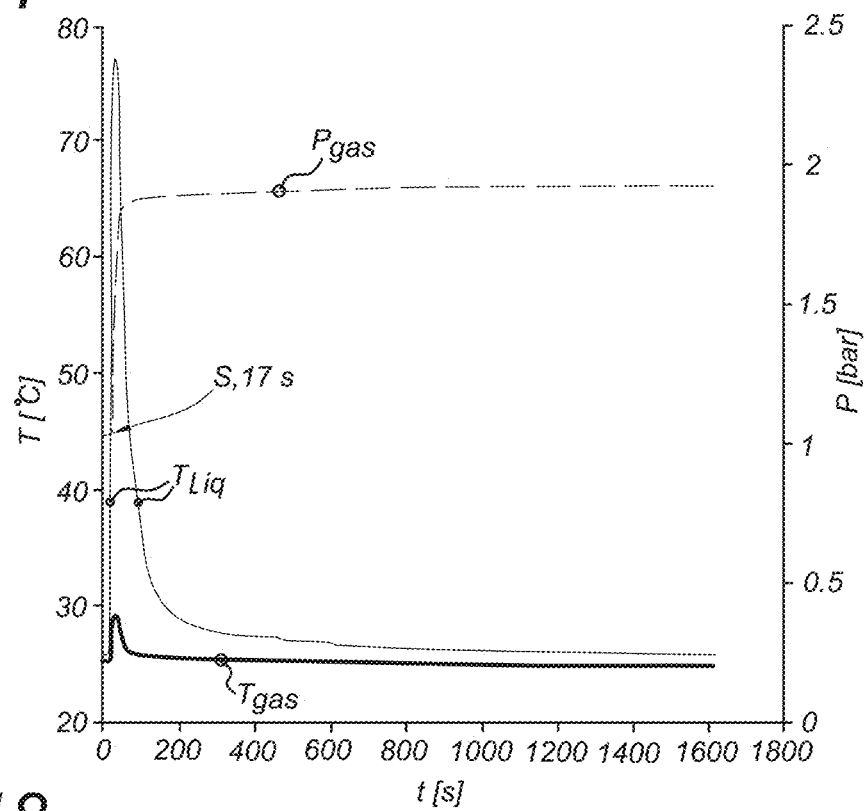
FIGS. 17, 18 and 19 show graphs of temperatures and pressure monitored for three experiments carried out.
Figure 18:
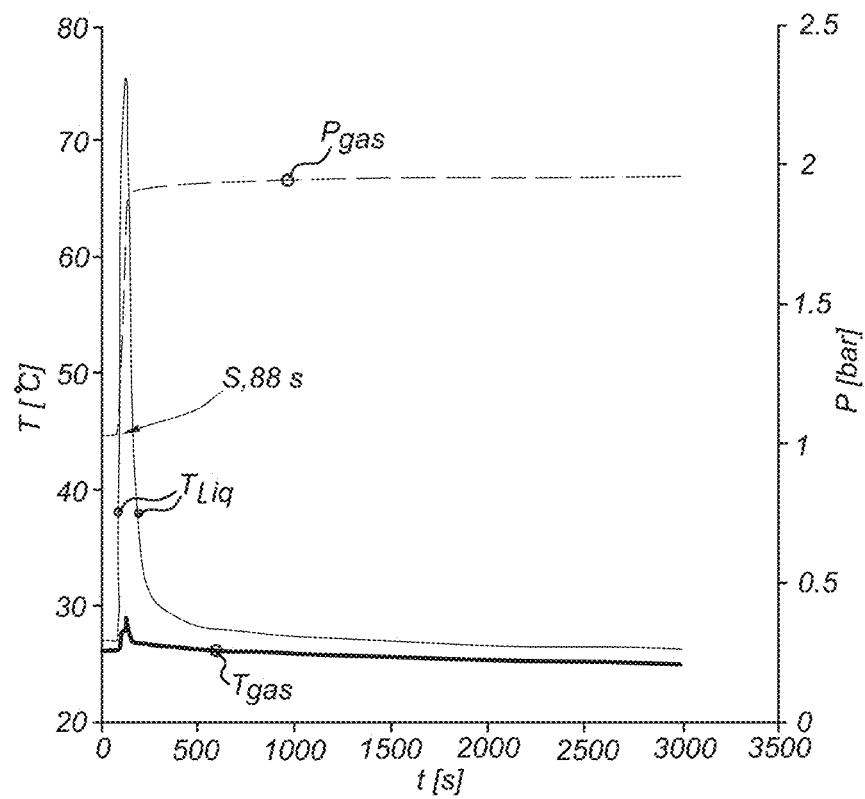
Figure 19:
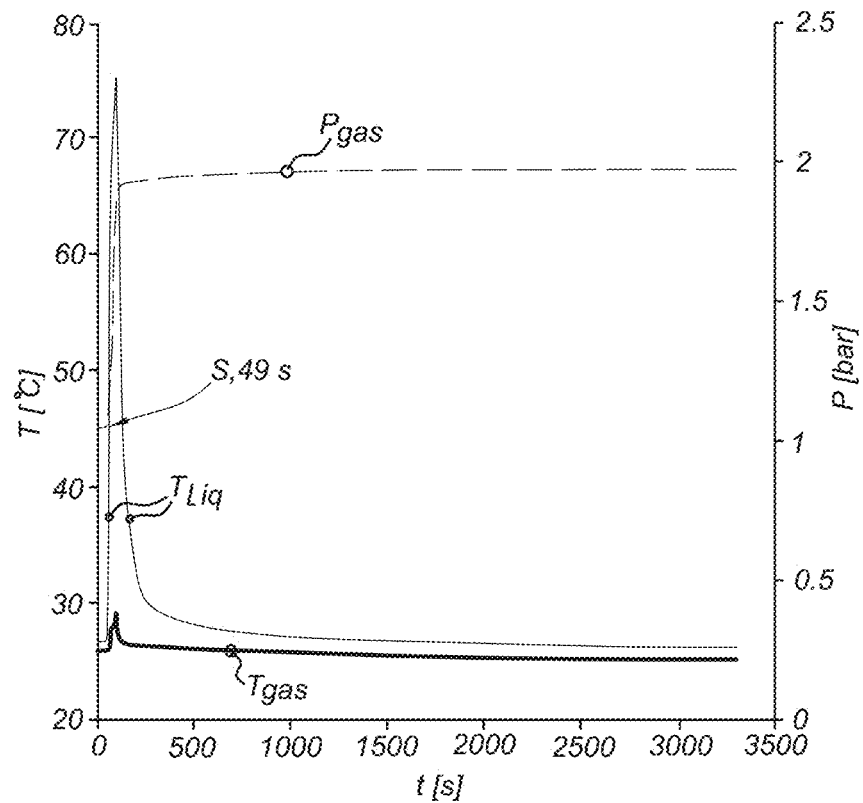

The pressure and temperature profiles of experiments YPEvG119, YPEvG120 and YPEvG121 are given in FIGS. 17 to 19, respectively. The reaction started when the activator solution was added, which is indicated by S together with the time in seconds after start of the taking measurements in FIGS. 17 to 19. It is followed by a rapid increase in temperature of the liquid ($T_{liq}$), which peaks at 75-77° C. Simultaneously, the gas pressure showed a rapid increase indicating the production of gas. The resulting stable pressure and corresponding temperature, as well as the starting pressure and temperature are given below:

| Experiment reference | $P_{start}$ [bara] | $T_{start}$[1] [° C.] | $P_{end}$ [bara] | $T_{end}$ [° C.] |
|---|---|---|---|---|
| YPEvG119 | 1.03 | 25.3 | 1.92 | 24.8 |
| YPEvG120 | 1.03 | 26.2 | 1.96 | 25.0 |
| YPEvG121 | 1.04 | 25.8 | 1.97 | 25.1 |

[1]$T_{start}$ was higher due to the preflushing with nitrogen and applying a vacuum The increase in gas temperature ($T_{gas}$) is much less pronounced due to the rapid cooling through interaction with the reactor vessel walls.

Gas Chromatography (GC) Results

Figure 21:
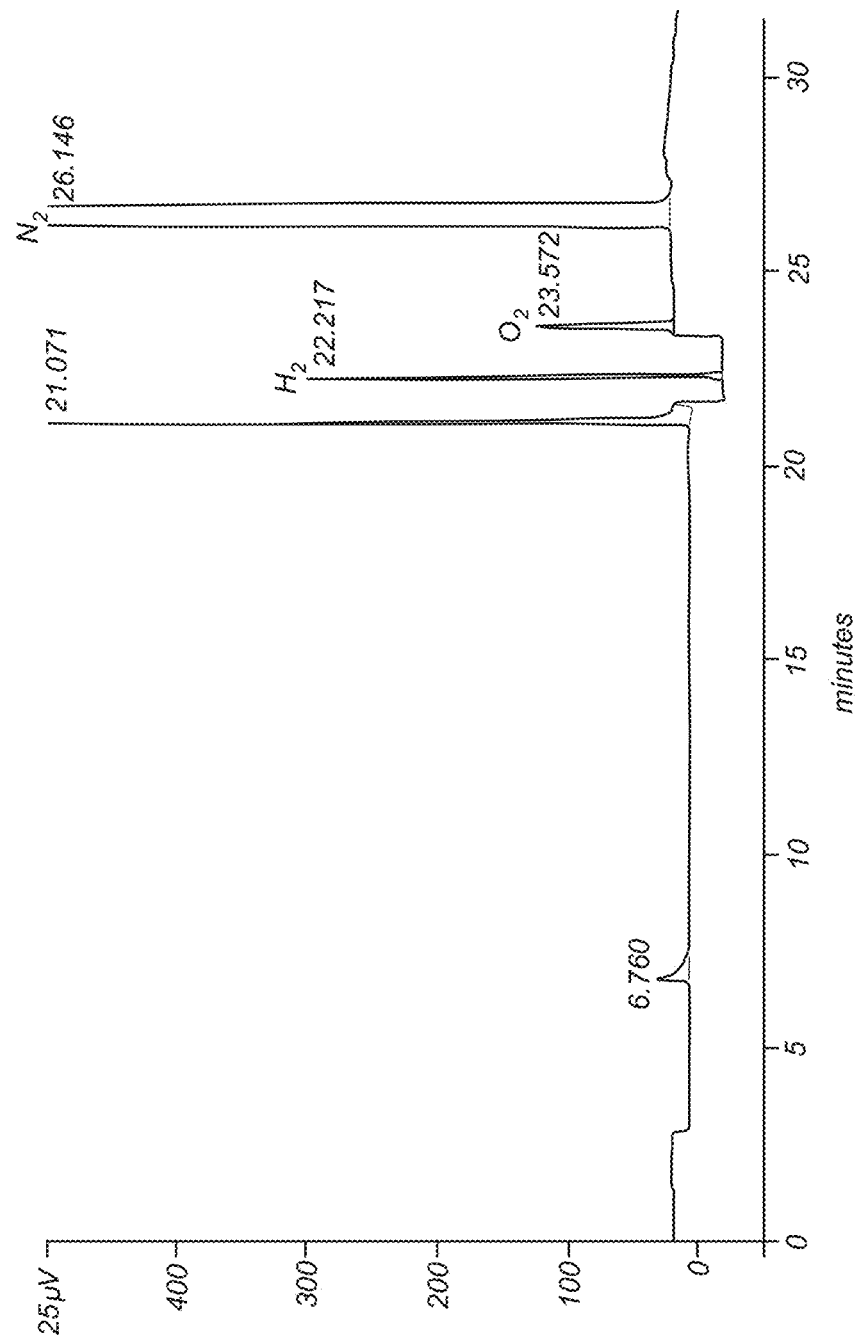
FIG. 21 shows a gas chromatography (GC) graph from a GC measurement carried out on the gas produced in an experiment.

The gas chromatography (GC) analysis plot for experiment YPEvG-121 is given in FIG. 21 as an example. The analysis is reported in report 15EM/0712 of institute TNO in the Netherlands. The following table shows the results form analyzing the plot of FIG. 21:

| RetTime [min] | Type | Area [25 μV s] | Amt/Area | Amount [% vol] | Name |
|---|---|---|---|---|---|
| 2.932 | | — | | | carbon dioxide ($CO_2$) |
| 4.527 | | — | | | ammonia ($NH_3$) |
| 22.217 | BB | 1319.35925 | 3.44871e−2 | 45.50090 | hydrogen ($H_2$) |
| 23.572 | BB | 652.65613 | 8.44455e−4 | 5.51139e−1 | oxygen ($O_2$) |
| 26.146 | BB | 6.81704e4 | 7.76071e−4 | 52.90504 | nitrogen ($N_2$) |
| 28.397 | | — | | | methane ($NH_4$) |
| 31.683 | | — | | | carbon monoxide (CO) |
| Total: | | | | 98.95708 | |

The hydrogen ($H_2$) and nitrogen ($N_2$) concentrations derived from the gas chromatography measurements are given in the table below:

| Experiment reference | $H_2$ gas [% vol] | $N_2$ gas [% vol] | Other [% vol] |
|---|---|---|---|
| YPEvG119 | 45.3 | 53.2 | 1.5 |
| YPEvG120 | 45.2 | 52.9 | 1.9 |
| YPEvG121 | 45.5 | 52.8 | 1.7 |

Because the setup is flushed with nitrogen before each test, other gases in the analyses mostly result from the reaction inside the vessel. As can be seen from the above table, the GC measurement detected almost exclusively hydrogen gas and nitrogen gas. Small amounts of water and oxygen were also detected. The oxygen and to a potentially lesser extent the water were already present before combining the fuel and the activator solution and are therefore included in the starting pressure.

X-Ray Diffraction (XRD) Results

Figure 20:
FIG. 20 shows solid residue obtained in an experiment.

The residue from the reaction before drying is a grey solid. After drying in vacuum a white solid is obtained. The solid obtained from experiment YPEvG119 is shown in FIG. 20. This white residue from experiment YPEvG119 was analyzed using x-ray diffraction (XRD).

The solid residues of the experiments were qualitatively evaluated by XRD. XRD is limited to the identification of crystalline compounds. None of the diffractograms pointed towards large amounts of amorphous compounds. The XRD diffractogram pattern measured is given in FIG. 22. Three library patterns are found to overlap well with the measured pattern. The crystalline solids corresponding to these library patterns identified are given in the table below:

| | Pattern reference | Chemical formula | Substance name |
|---|---|---|---|
| 1 | PDF 00-007-0277 | $Na_2B_4O_7 \cdot 5H_2O$ | Tincalconite, syn |
| 2 | PDF 00-005-0628 | NaCl | Halite, syn |
| 3 | PDF 01-075-2259 | $Na_2ClB(OH)_4$ | Teepleite, syn |

Figure 22:
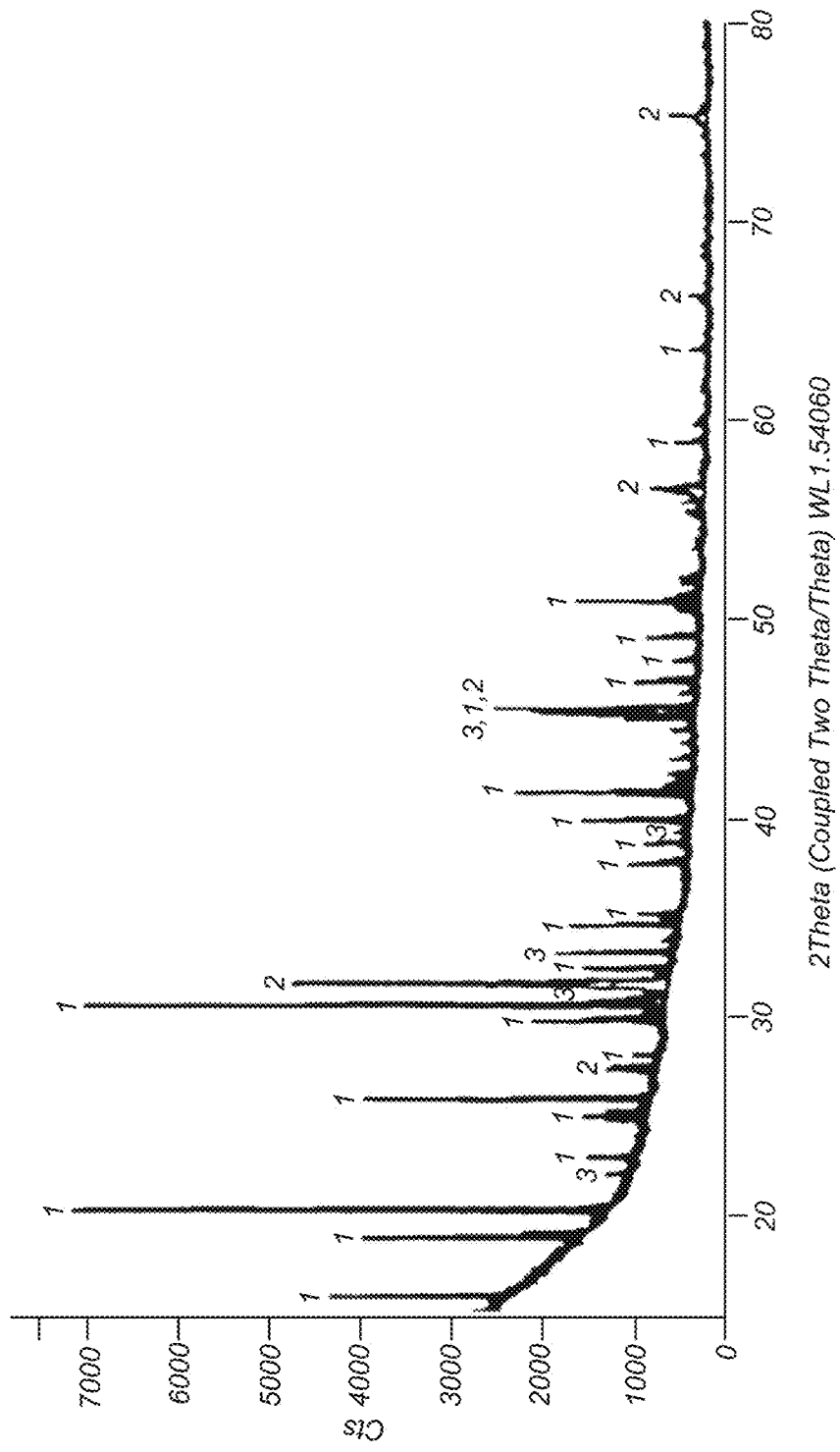
FIG. 22 shows an x-ray diffraction (XRD) graph from an XRD measurement carried out on the residue shown in FIG. 20.

The integer number in the first column of the table above is used to identify peaks of the corresponding pattern in FIG. 22. The peaks identified with '2' thus correspond with pattern PDF 00-005-0628 corresponding to NaCl. The analysis report of the XRD analysis is also reported in report 15EM/0712 of institute TNO in the Netherlands.

DISCUSSION

The GC results indicate that the gas produced is almost completely hydrogen gas in all experiments. Therefore, the pressure increase can be used to determine the absolute value of hydrogen gas produced (applying the ideal gas law, which is applicable due to the low pressures). The molar quantities of hydrogen gas, as well as the starting molar quantities of nitrogen gas are calculated. Both are translated to their respective volume percentages and compared with the GC results. These calculated molar quantities and volume percentages of hydrogen and nitrogen are given in the table below:

| Experiment reference | Pressure based [mol] | | Pressure based [% vol] | | GC results [% vol] | |
|---|---|---|---|---|---|---|
| | $N_2$ | $H_2$ | $N_2$ | $H_2$ | $N_2$ | $H_2$ |
| YPEvG119 | 0.0076 | 0.0066 | 53 | 47 | 53 | 45 |
| YPEvG120 | 0.0075 | 0.0069 | 52 | 48 | 53 | 45 |
| YPEvG121 | 0.0076 | 0.0069 | 53 | 47 | 53 | 46 |

The calculated volume percentages results are consistent with the measured volume percentages the GC experiments. The GC results on hydrogen show a lower concentration of hydrogen gas. The calculated amounts of hydrogen from the pressure values should therefore be seen as maximum values.

In the table below the calculated amounts of hydrogen are compared to the theoretical maximum amounts of hydrogen which can be produced from sodium borohydride according to the reaction formula using the mass of $NaBH_4$ employed in the fuel (the ratio is designated as yield):

$$NaBH_4 + 2H_2O \rightarrow NaBO_2 + 4H_2$$

This is the ideal reaction formula of the decomposition reaction of sodium borohydride. The actual reaction could be different (as also indicated by the XRD results). However, for comparison in relation to the theoretical maximum this is an appropriate reaction equation. The table below also gives the ratio of the mass of hydrogen gas produced and the total mass of the fuel and activator solution applied (designated as efficiency):

| Experiment reference | $H_2$ [mol] | Theoretical $H_2$ [mol] | Yield [% mol] | Fuel [gram] | Activator [gram] | Efficiency [% wt] |
|---|---|---|---|---|---|---|
| YPEvG119 | 0.0066 | 0.0071 | 93 | 0.2008 | 0.3352 | 2.5 |
| YPEvG120 | 0.0069 | 0.0070 | 98 | 0.1993 | 0.3331 | 2.6 |
| YPEvG121 | 0.0069 | 0.0071 | 98 | 0.2001 | 0.3554 | 2.5 |
| Average: | — | — | 96 | — | — | 2.5 |

The yields obtained are close to the theoretical maximum of 100%. Experiment YPEvG119 has a lower yield than the other two experiments. No direct reason can be found, but leakage of some $H_2$ seems likely. It is not likely that it is related to the shorter measurement time because the pressure was already constant (and the reaction completed) for a considerable amount of time as can also be seen in FIG. 14.

CONCLUSIONS

The objective of the experiments was to validate whether the fuel mixture H2Fuel produces hydrogen gas when brought in contact with the activator solution.

The GC analysis indicates that predominately hydrogen gas is produced. Nitrogen and hydrogen gas are detected with small amounts of oxygen and water. The pressure increase can be attributed to the $H_2$ production and therewith used to quantify the amount of $H_2$ produced. The resulting values should be seen as maximum values.

The fuel in reaction with the activator solution produces hydrogen gas with an average of 96% mol of the theoretical maximum, while the maximum in practice is 98% mol due to specifications of $NaBH_4$, and in an efficiency of 2.5% wt in relation to the total mass of fuel and activator solution combined. In this case an overdose is provided to the acid and water in order to obtain the maximum of hydrogen conversion in the shortest possible period of time after injection.

XRD analysis indicate that no sodium borohydride or other crystalline borohydrides remained after reaction. Minerals detected were predominately kitchen salt and sodium borates. This indicates the reaction reached completion.

The invention claimed is:
1. A method for obtaining a mixture for producing $H_2$, the mixture comprising a metal borohydride, $Me(BH_4)_n$, a metal hydroxide, $Me(OH)_n$, and $H_2O$, in which Me is a metal and n is the valance of the metal ion, wherein $H_2O$ is provided as ultrapure water, UPW, the UPW having an electrical conductance below 0.06 µS/cm, and the method comprises dissolving the metal borohydride and the metal hydroxide in UPW to obtain the mixture for producing $H_2$ comprising an amount of borohydride, $BH_4$, groups of the metal borohydride in the range of 45 to 55% mol of the mixture, an amount of hydroxide, OH, groups of the metal hydroxide in the range of 2 to 5% mol of the mixture, and UPW substantially for the remainder of the mixture.
2. The method according to claim 1, wherein the method comprises the steps of
dissolving an amount of the metal hydroxide in $H_2O$ to provide an auxiliary mixture of metal hydroxide dissolved in $H_2O$; and
dissolving an amount of the metal borohydride in the auxiliary mixture of metal hydroxide dissolved in $H_2O$ to provide the mixture for producing $H_2$.
3. The method according to claim 1, wherein the mixture for producing $H_2$ comprises an amount of hydroxide groups of the metal hydroxide in the range of 3 to 4% mol.
4. The method according to claim 1, wherein the mixture for producing $H_2$ comprises an amount of borohydride groups of the metal borohydride in the range of 48 to 53% mol.
5. A mixture for producing $H_2$, wherein the mixture comprises a metal borohydride, $Me(BH_4)_n$, and a metal hydroxide, $Me(OH)_n$, dissolved in $H_2O$, in which Me is a metal and n is the valance of the metal ion, wherein $H_2O$ is provided as ultrapure water, UPW, the UPW having an electrical conductance below 0.06 µS/cm, and the mixture comprises an amount of borohydride, $BH_4$, groups of the metal borohydride in the range of 45 to 55% mol of the mixture, an amount of hydroxide, OH, groups of the metal hydroxide in the range of 2 to 5% mol of the mixture, and UPW substantially for the remainder of the mixture.
6. A mixture for producing $H_2$, wherein the mixture comprises a metal borohydride, $Me(BH_4)_n$, and a metal hydroxide, $Me(OH)_n$, dissolved in $H_2O$, in which Me is a metal and n is the valance of the metal ion, wherein $H_2O$ is provided as ultrapure water, UPW, the UPW having an electrical conductance below 0.06 µS/cm, and the mixture comprises an amount of borohydride, $BH_4$, groups of the metal borohydride in the range of 45 to 55% mol, of the mixture, an amount of hydroxide, OH, groups of the metal hydroxide in the range of 2 to 5% mol, of the mixture, and UPW substantially for the remainder of the mixture, wherein the mixture is obtained by the method according to claim 1.
7. The method according to claim 1, wherein the UPW satisfies having an Electronics and Semiconductor Grade Water ASTM Type E-1 classification or better.

8. The method according to claim 1, wherein the metal, Me, is at least one of lithium, Li; sodium, Na; and potassium, K.

9. The method according to claim 1, wherein the metal, Me, is sodium, Na, and the mixture for producing $H_2$ comprising an amount of sodium borohydride, $NaBH_4$, in the range of 58 to 72% wt of the mixture, and an amount of sodium hydroxide, NaOH, in the range of 3 to 7% wt of the mixture.

10. The mixture of claim 5, wherein the mixture comprises an amount of borohydride, $BH_4$, groups of the metal borohydride in the range of the range of 48 to 53% mol, of the mixture.

11. The mixture of claim 5, wherein the mixture comprises an amount of hydroxide, OH, groups of the metal hydroxide in the range of 3 to 4% mol, of the mixture.

12. The method of claim 9, wherein the mixture for producing $H_2$ comprises an amount of sodium borohydride, $NaBH_4$, in the range of 62 to 69% wt, of the mixture.

13. The method of claim 9, wherein the mixture for producing $H_2$ comprises an amount of sodium hydroxide, NaOH, in the range of 4 to 6% wt, of the mixture.

14. The method according to claim 2, wherein the mixture for producing $H_2$ comprises an amount of hydroxide groups of the metal hydroxide in the range of 3 to 4% mol.

15. The method according to claim 2, wherein the mixture for producing $H_2$ comprises an amount of borohydride groups of the metal borohydride in the range of 48 to 53% mol.

16. The method according to claim 3, wherein the mixture for producing $H_2$ comprises an amount of borohydride groups of the metal borohydride in the range of 48 to 53% mol.

* * * * *